US012693019B2

(12) United States Patent
Naik et al.

(10) Patent No.: US 12,693,019 B2
(45) Date of Patent: Jul. 28, 2026

(54) GAS TURBINE ENGINE AND FUEL NOZZLE ASSEMBLY THEREFOR

(71) Applicant: General Electric Company, Cincinnati, OH (US)

(72) Inventors: Pradeep Naik, Bengaluru (IN); Karthikeyan Sampath, Bengaluru (IN); Michael A. Benjamin, Cincinnati, OH (US); Sibtosh Pal, Mason, OH (US); Michael T. Bucaro, Arvada, CO (US); Prithiviraaj Pet T, Madurai (IN); Pabitra Badhuk, Jhargram (IN); Clayton S. Cooper, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/779,279

(22) Filed: Jul. 22, 2024

(65) Prior Publication Data

US 2026/0022838 A1     Jan. 22, 2026

(51) Int. Cl.
   F23R 3/28          (2006.01)
   F02C 3/22          (2006.01)
   (Continued)

(52) U.S. Cl.
   CPC ................ F23R 3/286 (2013.01); F02C 3/22 (2013.01); F02C 9/40 (2013.01); F23R 3/346 (2013.01)

(58) Field of Classification Search
   CPC .. F23R 3/286; F23R 3/34; F23R 3/343; F23R 3/346; F23R 3/36; F02C 3/22; F02C 9/40
   See application file for complete search history.

(56) References Cited

U.S. PATENT DOCUMENTS

| | | | |
|---|---|---|---|
| 5,295,354 A | 3/1994 | Barbier et al. |
| 5,351,477 A | 10/1994 | Joshi et al. |
| (Continued) | | | |

FOREIGN PATENT DOCUMENTS

| | | |
|---|---|---|
| EP | 4209714 A1 | 7/2023 |
| EP | 4212775 A1 | 7/2023 |
| (Continued) | | |

OTHER PUBLICATIONS

Extended European Search Report issued in corresponding application EP25189103.2 dated Nov. 18, 2025.

*Primary Examiner* — Gerald L Sung
*Assistant Examiner* — Jingchen Liu
(74) *Attorney, Agent, or Firm* — Carter, DeLuca & Farrell LLP

(57)          ABSTRACT

A gas turbine engine, comprising a compressor section, combustion section, and turbine section in serial flow arrangement, with the combustion section comprising: a combustor liner that at least partially defines a combustion chamber; and a gaseous fuel nozzle assembly fluidly coupled with the combustion chamber and comprising: a rich fuel supply configured to provide a rich mixture of gaseous fuel and air; a lean fuel supply configured to provide a lean mixture of gaseous fuel and air, the lean mixture having a lower equivalence ratio than the rich mixture; a rich fluid passage fluidly coupled to the rich fuel supply to emit the rich mixture into the combustion chamber; and a lean fluid passage fluidly coupled to the lean fuel supply to emit the lean mixture into the combustion chamber.

9 Claims, 21 Drawing Sheets

(51) Int. Cl.
    *F02C 9/40*       (2006.01)
    *F23R 3/34*       (2006.01)

(56)           References Cited

U.S. PATENT DOCUMENTS

| | | | | |
|---|---|---|---|---|
| 5,408,825 | A | 4/1995 | Foss et al. | |
| 5,590,529 | A | 1/1997 | Joshi et al. | |
| 6,317,680 | B1 | 11/2001 | Luttrell et al. | |
| 7,343,745 | B2 | 3/2008 | Inoue et al. | |
| 7,669,421 | B2 | 3/2010 | Saitoh et al. | |
| 11,353,215 | B1* | 6/2022 | Tentorio ................. | F23R 3/343 |
| 11,454,396 | B1 | 9/2022 | Boardman et al. | |
| 2002/0162333 | A1* | 11/2002 | Zelina ..................... | F23R 3/286 |
| | | | | 60/737 |
| 2005/0282097 | A1 | 12/2005 | Carrea et al. | |
| 2007/0227156 | A1* | 10/2007 | Saito ....................... | F02C 3/14 |
| | | | | 60/772 |
| 2008/0078160 | A1 | 4/2008 | Kraemer et al. | |
| 2008/0236165 | A1* | 10/2008 | Baudoin ................ | F23R 3/343 |
| | | | | 60/746 |
| 2016/0245522 | A1* | 8/2016 | Dai ........................ | F23R 3/343 |
| 2017/0299183 | A1* | 10/2017 | Bagchi ..................... | F23R 3/16 |
| 2019/0056110 | A1* | 2/2019 | Stevens ................... | F23R 3/286 |
| 2023/0220802 | A1 | 7/2023 | Bucaro et al. | |
| 2023/0250959 | A1* | 8/2023 | Shin ........................ | F23R 3/36 |
| | | | | 60/737 |

FOREIGN PATENT DOCUMENTS

| | | | |
|---|---|---|---|
| EP | 4628797 | A1 | 10/2025 |
| WO | 2023/214129 | A1 | 11/2023 |

* cited by examiner

GAS TURBINE ENGINE AND FUEL NOZZLE ASSEMBLY THEREFOR

TECHNICAL FIELD

The present subject matter relates generally to a gas turbine engine having a fuel nozzle assembly.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
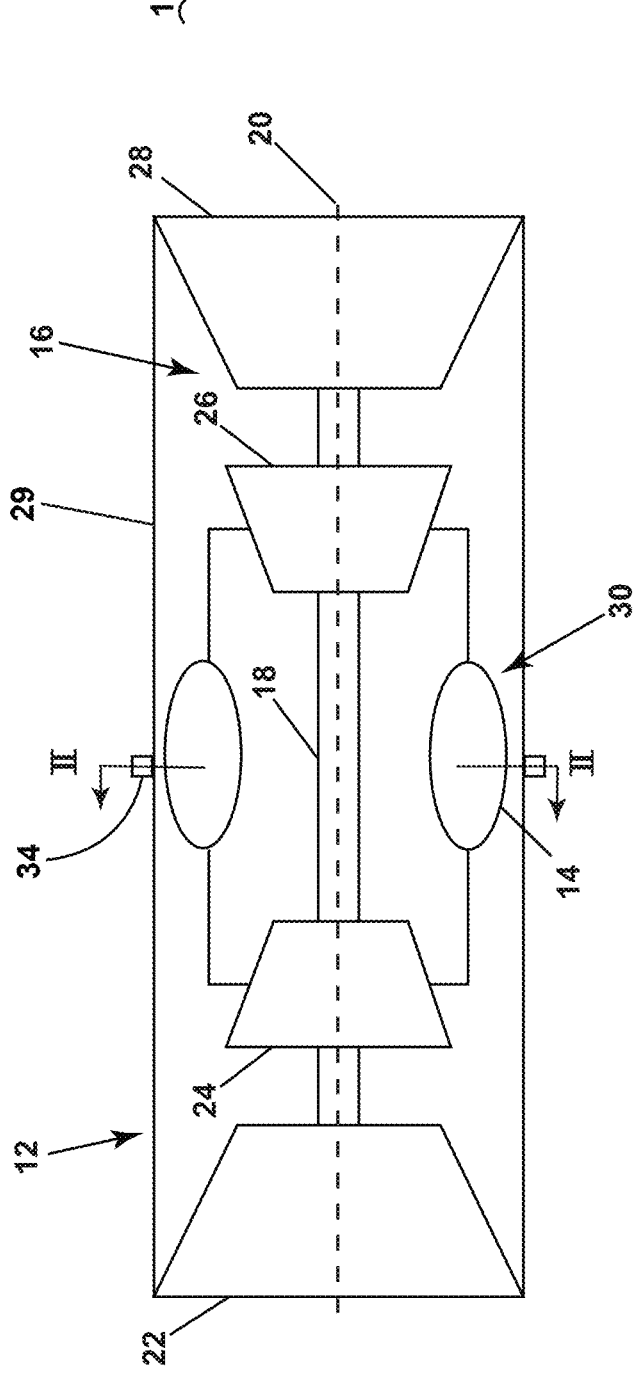
FIG. 1 is a schematic view of a gas turbine engine having a compressor section, a combustion section, and a turbine section in accordance with various aspects described herein.

Aspects of the disclosure described herein are directed to a combustor. With some aspects, the disclosed combustors and fuel nozzle assemblies can be utilized with gaseous fuel, such as hydrogen. Gaseous fuel, including hydrogen, spreads/disperses at a faster rate than atomized liquid fuel, which can involve less mixing time for the gaseous fuel, fuel mixing tube lengths can be shorter, and the flame from the gaseous fuel may be more likely to spread farther and faster, which can increase the risk of flashback and flameholding (e.g., in a nozzle or mixer), and increase the impact of controlling the flame and limiting flame spread by controlling the dispersion of the gaseous fuel.

Many other possible aspects and configurations in addition to those shown in the included figures are contemplated by the present disclosure. The disclosed fuel nozzle assemblies can provide greater flame stability, lower flame temperatures, reduced flashback, reduced flameholding, and lower NOx emissions relative to other designs, such as designs that utilize only a single fuel-air mixture, do not sufficiently mix fuel and air, or are not configured for use with gaseous fuels, such as hydrogen gas.

Outer fluid passages providing outside-in swirling flow and inner fluid passages providing inside-out swirling flow (e.g., diverging fluid passage configurations) can ensure rapid mixing downstream of the wall since the fluid moves in radially and axially different directions. Utilizing rich fuel-air mixtures (e.g., phi of at least 4) and lean mixtures (e.g., phi of less than or equal to 0.4) can limit or prevent flashback and flameholding within the mixer. Counter swirl between outer and inner fluid passages further improves rapid mixing of rich and lean fluids downstream that reduces NOx. Providing air through discrete holes or an annular passage outward of the fluid passages provides lower liner temperatures by avoiding scrubbing of flame on the combustor liner. Outer fluid passages can be non-swirling, swirling in same direction of inner fluid passages, or swirling in the opposite direction of inner fluid passages.

Adjacent fuel nozzle assemblies with opposite swirl directions can improve fuel air mixing and provide lower NOx emissions. A fuel nozzle assembly with a lean outer fluid passage and a second fuel nozzle assembly, adjacent the first fuel nozzle assembly, with a rich outer fluid passage can facilitate mixing of fuel and air between adjacent fuel nozzle assemblies to reduce NOx and increase flame stability. Fuel nozzle assemblies with rich outer fluid passages can achieve higher temperatures for better flame stability and combustion dynamics. Fuel nozzle assemblies with rich outer fluid passage can be included in a combustor among fuel nozzle assemblies with lean outer fluid passages to provide lower NOx emissions while maintaining flame stability. The number of fuel nozzle assemblies with rich outer fluid passages can be less than the number of fuel nozzle assemblies with lean outer fluid passages.

Air passages of the wall directed toward the combustor liner can limit or prevent flame scrubbing at the liner. Air passages of the combustor liner disposed at or angled toward the wall can cool the wall. The air passages of the liner can be circumferentially offset from air passages of the wall to limit interference. Outer and inner fluid passages can be directed towards each other radially, at least to some extent, to facilitate mixing the of the fluids emitted from the fluid passages.

For purposes of illustration, the present disclosure will be described with respect to a turbine engine. It will be understood, however, that aspects of the disclosure described herein are not so limited. A combustor as described herein can be implemented in various engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," is used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", etc. may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of gas turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

"Swirl number" is defined as an integral of the tangential momentum to the axial momentum of the flow of fluid downstream of a respective swirler.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis 20 for the gas turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a shroud or casing, which can extend circumferentially about and enshroud one or more sections of the gas turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the shroud or casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30.

During operation of the gas turbine engine 10, ambient or atmospheric air is drawn into the compressor section 12 via a fan upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
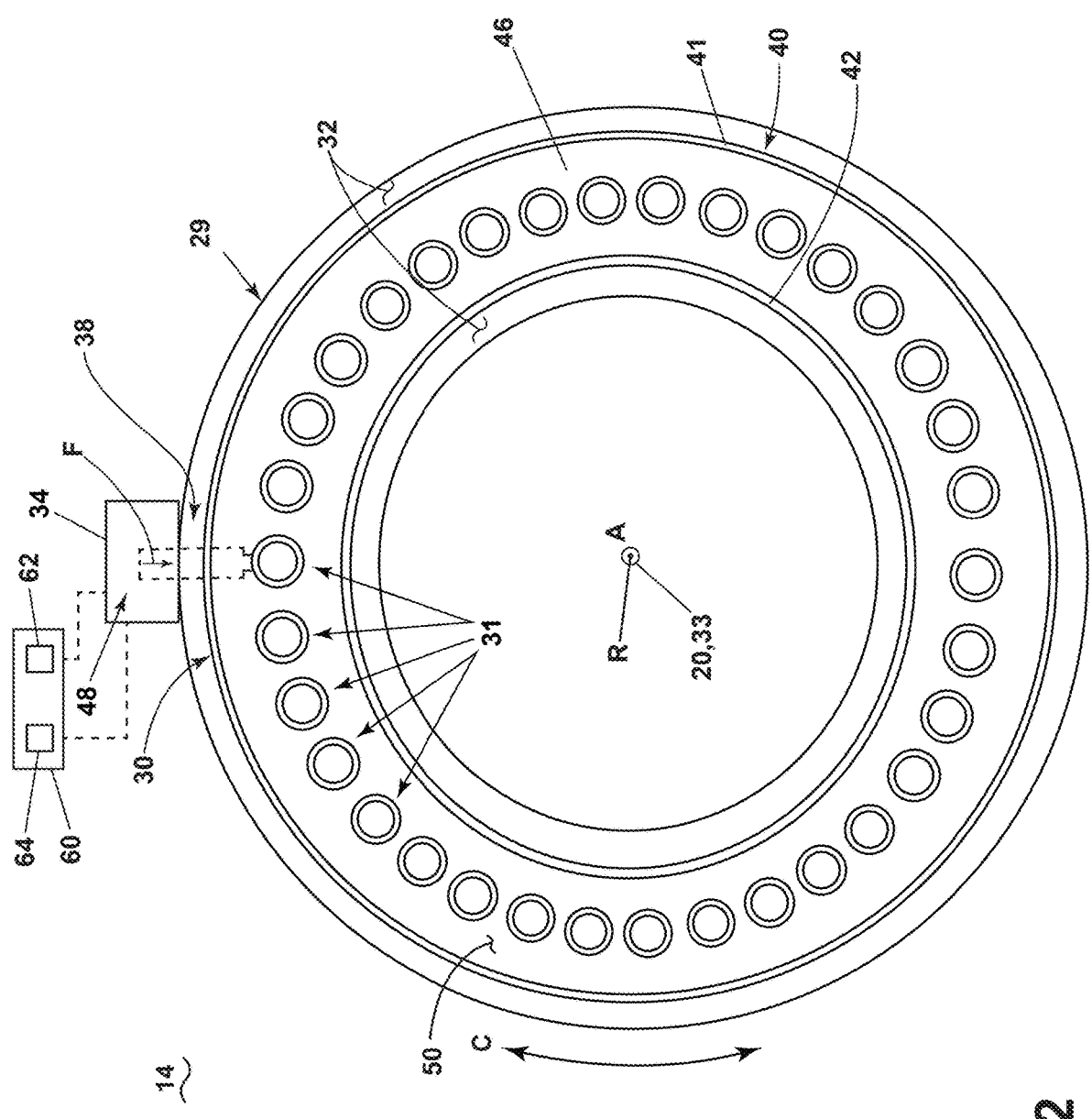
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustion section 14 can include the combustor 30 with an annular arrangement of combustor portions 31 disposed around the centerline or rotational axis 20 of the gas turbine engine 10 (e.g., circumferentially spaced from each other in an annular configuration) (FIG. 1). The combustor portions 31 can, in some configurations, include or be configured as combustor cups, fuel cups, or nozzle cups. A fuel nozzle assembly 48 can be connected to each combustor portion 31. The combustor 30 can have a can, can-annular, or annular arrangement depending on the type of engine in which the combustor 30 is located. In a non-limiting example, the combustor 30 can have a combination arrangement located with a shroud or casing 29 of the gas turbine engine 10 (FIG.

1). The shroud or casing 29 can enshroud or cover at least a portion of the combustion section 14.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. In some examples, the combustor liner 40 can have an annular structure about the combustor 30. In some examples, the combustor liner 40 can include multiple segments or portions collectively forming the combustor liner 40. In some examples, the combustor liner 40 can include the outer liner 41 radially spaced from the inner liner 42. In some examples, the combustor liner 40 can include a single liner.

The combustor liner 40 can at least partially define a combustion chamber 50 arranged annularly about the rotational axis 20. For example, a wall 46 (e.g., a dome wall) may be substantially perpendicular to the rotational axis 20 and can cooperate with the outer liner 41, the inner liner 42, or both, to at least partially define the combustion chamber 50. A compressed air passage 32 can be defined at least in part by both the combustor liner 40 and the casing 29.

The combustor 30 can include or be fluidly coupled to a fuel source 34 (e.g., an external fuel manifold) configured to provide fuel F. The fuel nozzle assembly 48 fluidly couples the fuel source 34 with the combustor portions 31 and the combustion chamber 50. The fuel nozzle assembly 48 can include a fuel nozzle body 38. Fuel F can include any suitable fuel, including gaseous fuel, such as hydrogen fuel, in non-limiting examples, which can include 100% $H_2$ (e.g., without diluents). For example, the fuel nozzle assembly 48 can be a gaseous fuel nozzle assembly, such as a gaseous hydrogen fuel nozzle assembly. In some examples, other fuels can be utilized instead of or with hydrogen. For example, the fuel F can comprise hydrogen and methane, such as in the form of natural gas. The combustor portions 31 can be separately connected to the wall 46. For example, and without limitation, the combustor portions 31 can be connected to the wall 46 in a circumferentially spaced configuration. The combustor portions 31 can be disposed at a radial distance from the rotational axis 20 that is greater than a radial distance of the inner liner 42 and less than a radial distance of the outer liner 41. A controller 60 can be connected to and at least partially control operation of the fuel source 34, the fuel nozzle assembly 48, or both. The controller 60 can include a processor 62 and a memory 64. A combustion section centerline 33 of the combustion section 14 can be collinear with the rotational axis 20. The combustion section centerline 33 can define a radial direction R, an axial direction A, and a circumferential direction C.

Figure 3:
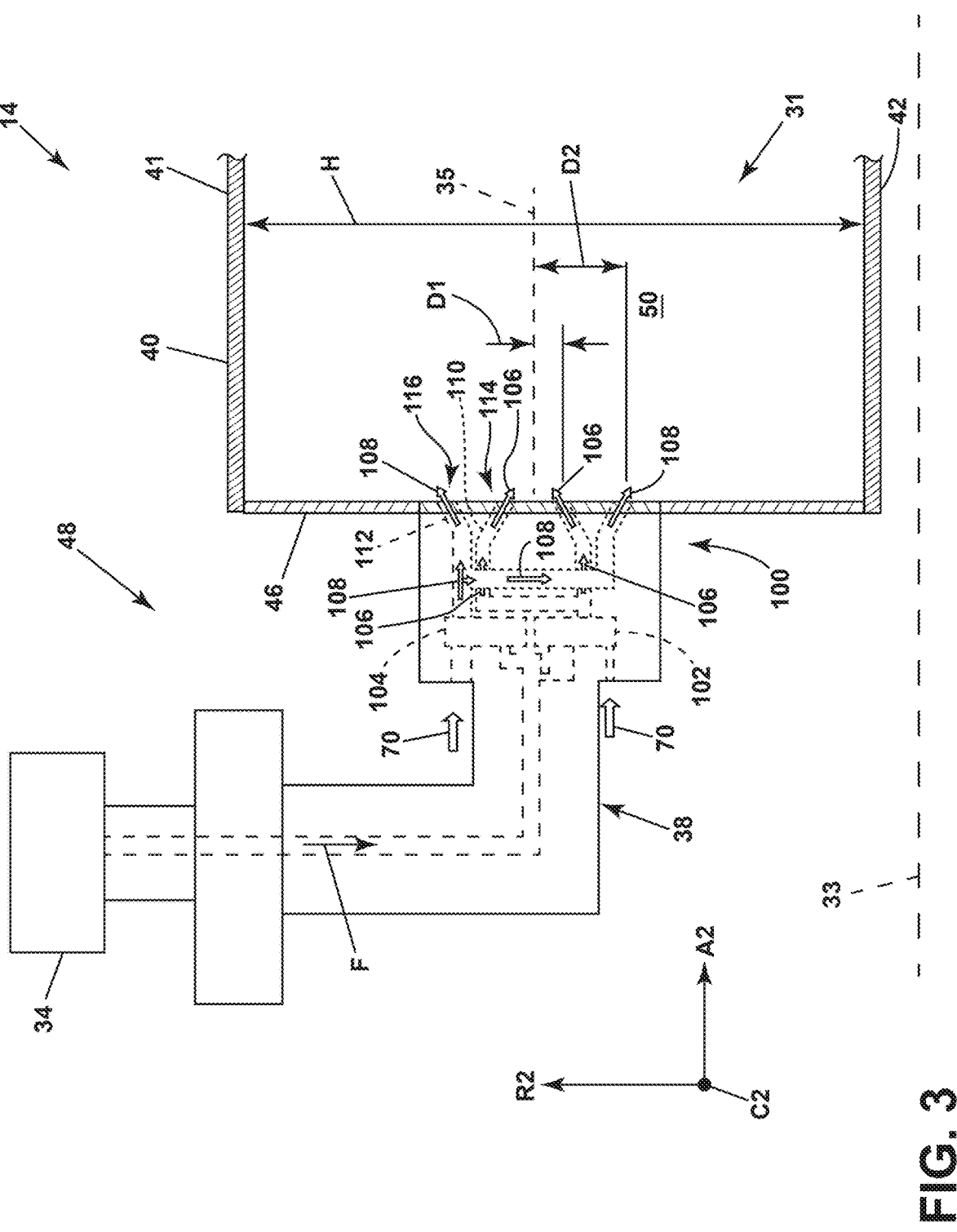
FIG. 3 is a schematic cross-sectional view illustrating portions of a fuel nozzle assembly coupled to a combustion chamber in accordance with various aspects described herein.

FIG. 3 is a cross-sectional schematic view of an example of one of the combustor portions 31, which can be provided, at least in part, by the fuel nozzle assembly 48. The fuel nozzle assembly 48 can be coupled, directly or indirectly, to the wall 46 and the combustor liner 40. In some examples, the fuel nozzle assembly 48 can provide at least a portion of the wall 46. The fuel nozzle assembly 48 can include a fuel nozzle assembly centerline 35 that is parallel with and radially offset from the combustion section centerline 33. The fuel nozzle assembly centerline 35 can be concentric with a centerline of the combustor portion 31 to which the fuel nozzle assembly 48 is coupled. The fuel nozzle assembly centerline 35 can define a second radial direction R2, a second axial direction A2, and a second circumferential direction C2. The second axial direction A2 can be parallel to the axial direction A (FIG. 2).

The fuel nozzle assembly 48 (e.g., the fuel nozzle body 38) includes a mixer 100 (e.g., a fuel-air mixer) comprising a first fluid supply 102, a second fluid supply 104, a first fluid passage 110, and a second fluid passage 112. The first fluid supply 102 can provide a first fluid 106. The second fluid supply 104 can provide a second fluid 108. The first fluid passage 110 and the second fluid passage 112 can extend to or through the wall 46, such as to the combustion chamber 50. The first fluid passage 110 and the second fluid passage 112 can have an output 114 (e.g., a rich fluid passage output) and an output 116 (e.g., a lean fluid passage output), respectively, at an aft surface of the wall 46. The first fluid passage 110 can be configured as a rich fluid passage for rich fuel and can be fluidly coupled with the first fluid supply 102. The first fluid supply 102 can, by way of further non-limiting example, be configured as a rich fuel supply that provides the first fluid 106 as a rich mixture of fuel F (e.g., gaseous fuel) and air 70, such as to the first fluid passage 110, which can emit the first fluid 106 (e.g., the rich mixture) into the combustion chamber 50. The first fluid supply 102 can be fluidly coupled with the fuel source 34 and a source of air 70, such as the compressor section 12 (FIG. 1). The second fluid supply 104 can, for example, be configured as a lean fuel supply that provides the second fluid 108 as a lean mixture of fuel F (e.g., gaseous fuel) and air 70, such as to the second fluid passage 112, which can emit the second fluid 108 (e.g., the lean mixture) into the combustion chamber 50. The lean mixture has a lower equivalence ratio than the rich mixture. The first fluid supply 102 may mix a greater amount of fuel F with air 70 per unit volume of fluid than the second fluid supply 104 such that the rich mixture has a higher fuel-air ratio than the lean mixture. In some examples, the rich mixture can have an equivalence ratio (e.g., a rich equivalence ratio) of at least 4 and less than or equal to 10, which can provide increased flame stability relative to lower ratios and can reduce flame speed, which can reduce flashback. Additionally or alternatively, the lean mixture can include an equivalence ratio (e.g., a lean equivalence ratio) that is greater than 0 and less than or equal 0.4 (e.g., 10% or less than the rich mixture), which can reduce flame speed, flashback, and flameholding relative to other ratios. The equivalence ratio can be a ratio of the fuel-air ratio to a stoichiometric fuel-air ratio. The lean mixture has a lower equivalence ratio than the rich mixture. Such lean fuel-air mixtures reduce flame speed in the combustion chamber 50, which reduces flashback and flameholding in the fuel nozzle assembly 48 and reduces damage to the fuel nozzle assembly 48 and components connected thereto. For example, flame speed is reduced with both very lean fuel-air mixtures (e.g., equivalence ratios of 0 to 0.4) and very rich fuel-air mixtures (e.g., equivalence ratios of at least 4). In some configurations, the second fluid supply 104 can provide air 70 without fuel F (e.g., the second fluid 108 can include a fuel-air ratio of 0).

In some examples, the first fluid supply 102 can provide greater than or equal to 5% and less than or equal to 25% of a total amount of air 70 provided by the fuel nozzle assembly 48 to the combustion chamber 50. The second fluid supply 104 can provide the remainder of air 70 (e.g., 75% to 95%). Utilizing fluid with lesser amounts of air 70 (e.g., the first fluid 106) creates richer fuel-air mixtures compared to fluids with greater amounts of air 70 (e.g., the second fluid 108). In some examples, a total amount of fuel in the first and second fluids 106, 108 can be the same and the greater amount of air in the second fluid 108 can provide a leaner fuel-air mixture.

The first fluid passage 110 and the second fluid passage 112 can be annular, concentric, arranged in a diverging configuration, or combinations thereof. The diverging configuration can include one of the first fluid passage 110 or the second fluid passage 112 extending radially outward (e.g., angled at an angle greater than 0 degrees relative to the axial direction A) to emit fluid from the output 114 or the output 116 radially outward and the other of the first fluid passage 110 or the second fluid passage 112 extending radially inward to emit fluid from the output 114 or the output 116 fluid radially inward. With the example shown in FIG. 3, the first fluid passage 110 extends radially inward to emit the first fluid 106 radially inward from the output 114, and the second fluid passage 112 extends radially outward to emit the second fluid 108 radially outward from the output 116.

With some examples, the combustor liner 40 can include a height H defined between the outer liner 41 and the inner liner 42 in the radial direction R (FIG. 2) at or proximate the wall 46. The height H can, for example and without limitation, be at least 2 inches (5.1 cm) and less than or equal to 20 inches (50.8 cm). The first fluid passage 110 can include a diameter D1 defined in the second radial direction R2 between center points of the output 114 disposed opposite from each other relative to the fuel nozzle assembly centerline 35. The second fluid passage 112 can include a diameter D2, defined in the second radial direction R2 between center points of the output 116 disposed opposite from each other relative to the fuel nozzle assembly centerline 35. A ratio of the diameter D1 (e.g., a rich passage diameter) to the height H can, for example, be at least 0.1 and less than or equal to 0.6. A ratio of the diameter D2 (e.g., a lean passage diameter) to the height H can, for example, be at least 0.3 and less than or equal to 0.8.

Figure 4:
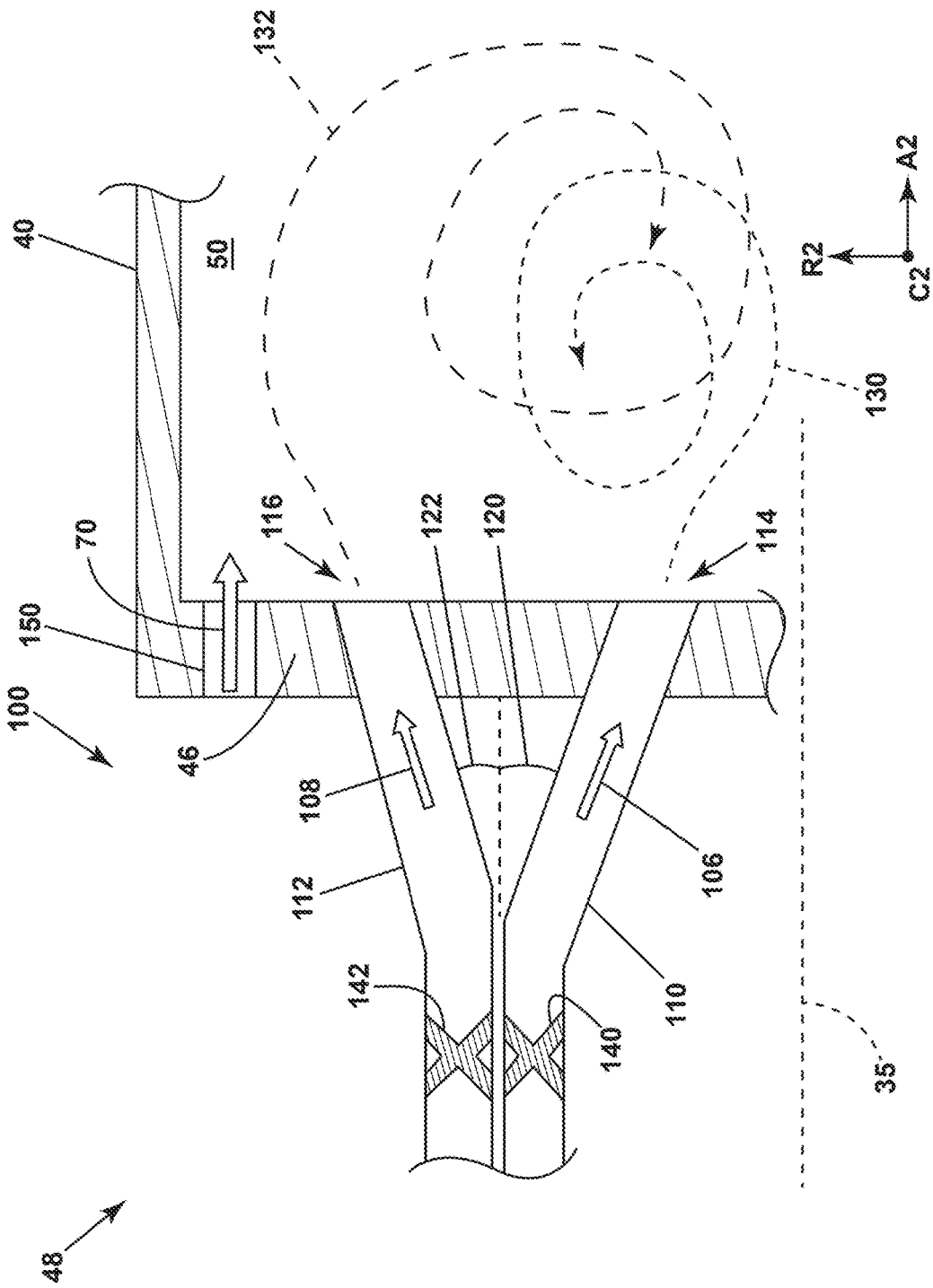
FIG. 4 is a schematic cross-sectional view illustrating portions of a fuel nozzle assembly coupled to a combustion chamber in accordance with various aspects described herein.
Figure 5:
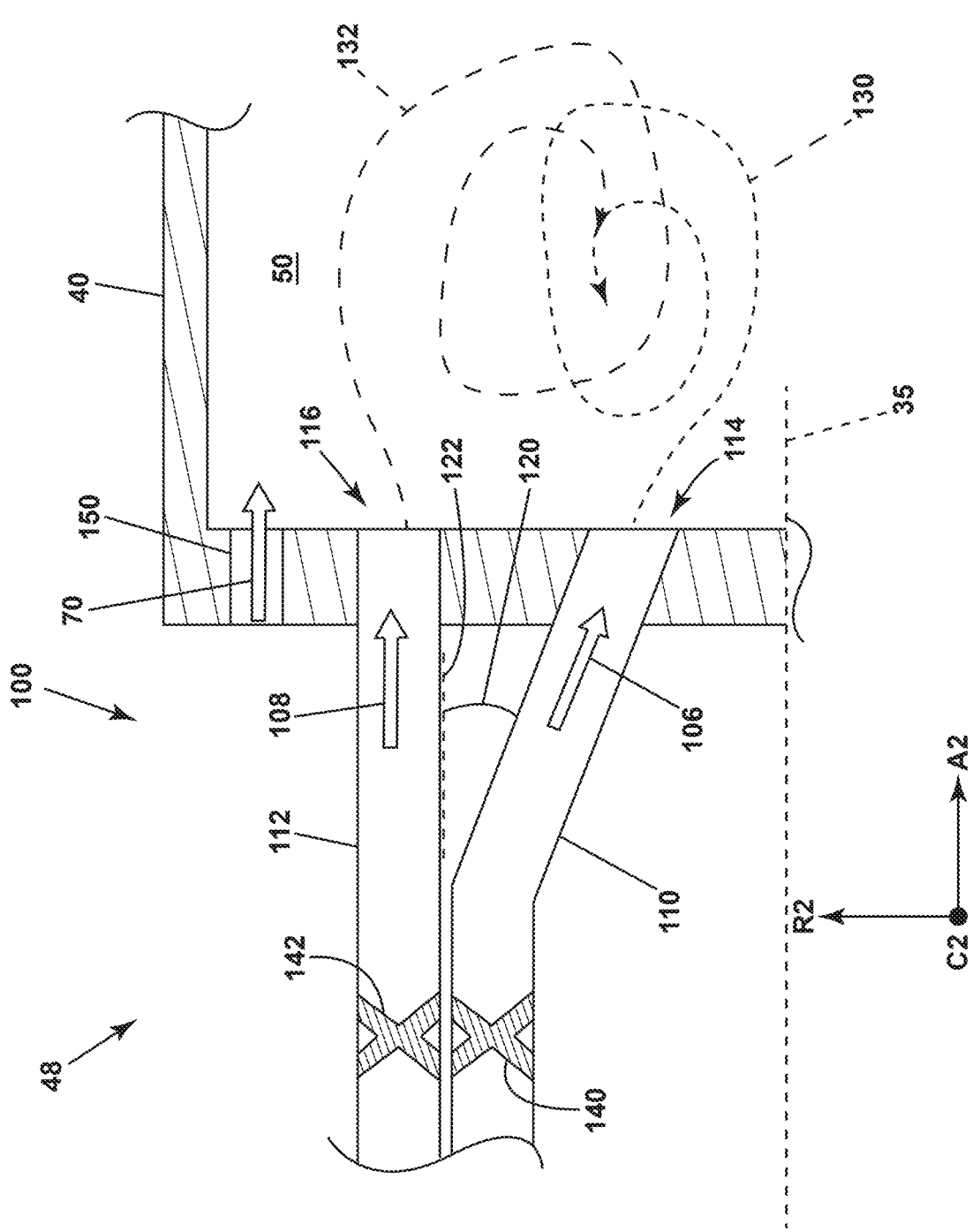
FIG. 5 is a schematic cross-sectional view illustrating portions of a fuel nozzle assembly coupled to a combustion chamber in accordance with various aspects described herein.

Referring to FIGS. 4 and 5, portions of the first fluid passage 110 and the second fluid passage 112 of the mixer 100 of the fuel nozzle assembly 48 are illustrated. The first fluid passage 110 can be disposed at a first angle 120 relative to the second axial direction A2. The first angle 120 can, for example, be greater than or equal to 0 degrees and less than or equal 60 degrees radially inward or less than or equal to 60 degrees radially outward. The second fluid passage 112 can be disposed at a second angle 122 relative to the second axial direction A2. The second angle 122 can, for example, be greater than or equal to 0 degrees and less than or equal 60 degrees radially inward or less than or equal to 60 degrees radially outward. In the example shown in FIG. 4, the first angle 120 is about 15 degrees radially inward and the second angle 122 is about 15 degrees radially outward. Referring to the example of FIG. 5, the first angle 120 is about 15 degrees radially inward and the second angle 122 is about 0 degrees such that the second fluid passage 112 is parallel with the second axial direction A2.

The first fluid passage 110 extending radially inward can generate a first recirculation 130 of the first fluid 106 in the combustion chamber 50. The first recirculation 130 has an inside-out configuration in which the first fluid 106 generally flows radially inward before flowing radially outward in a first spiral-type path (e.g., counterclockwise in FIG. 4). The second fluid passage 112 extending radially outward can generate a second recirculation 132 of the second fluid 108 in the combustion chamber 50. The second recirculation 132 has an outside-in configuration in which the second fluid 108 flows radially outward before flowing radially inward in a second spiral-type path (e.g., clockwise in FIG. 4). The fuel nozzle assembly 48 and the combustor liner 40 can be configured such that the first recirculation 130 and the second recirculation 132 overlap in the combustion chamber 50, which can facilitate mixing of the first fluid 106 and the second fluid 108. For example, the diverging configuration of the first and second fluid passages 110, 112 can facilitate mixing of the first fluid 106 and the second fluid 108 in the combustion chamber 50 and limit the amount of fuel F at the combustor liner 40.

The first fluid passage 110 can include a first swirler 140 disposed upstream of the output 114 to swirl the first fluid 106. The second fluid passage 112 can include a second swirler 142 disposed upstream of the output 116 to swirl the second fluid 108. Swirling one or both of the first fluid 106 and the second fluid 108 can improve mixing of the first fluid 106 with the second fluid 108 in the combustion chamber 50. In some examples, the first swirler 140 and the second swirler 142 can have opposite swirl directions (see arrows 144, 146 in FIG. 6), which can improve mixing of the first and second fluids 106, 108 in the combustion chamber 50. In some examples, swirl numbers for the first swirler 140, the second swirler 142, or both, can be greater than or equal to 0.2 and less than or equal to 1.4, which can limit flame length and flame scrubbing at the combustor liner 40.

Figure 6:
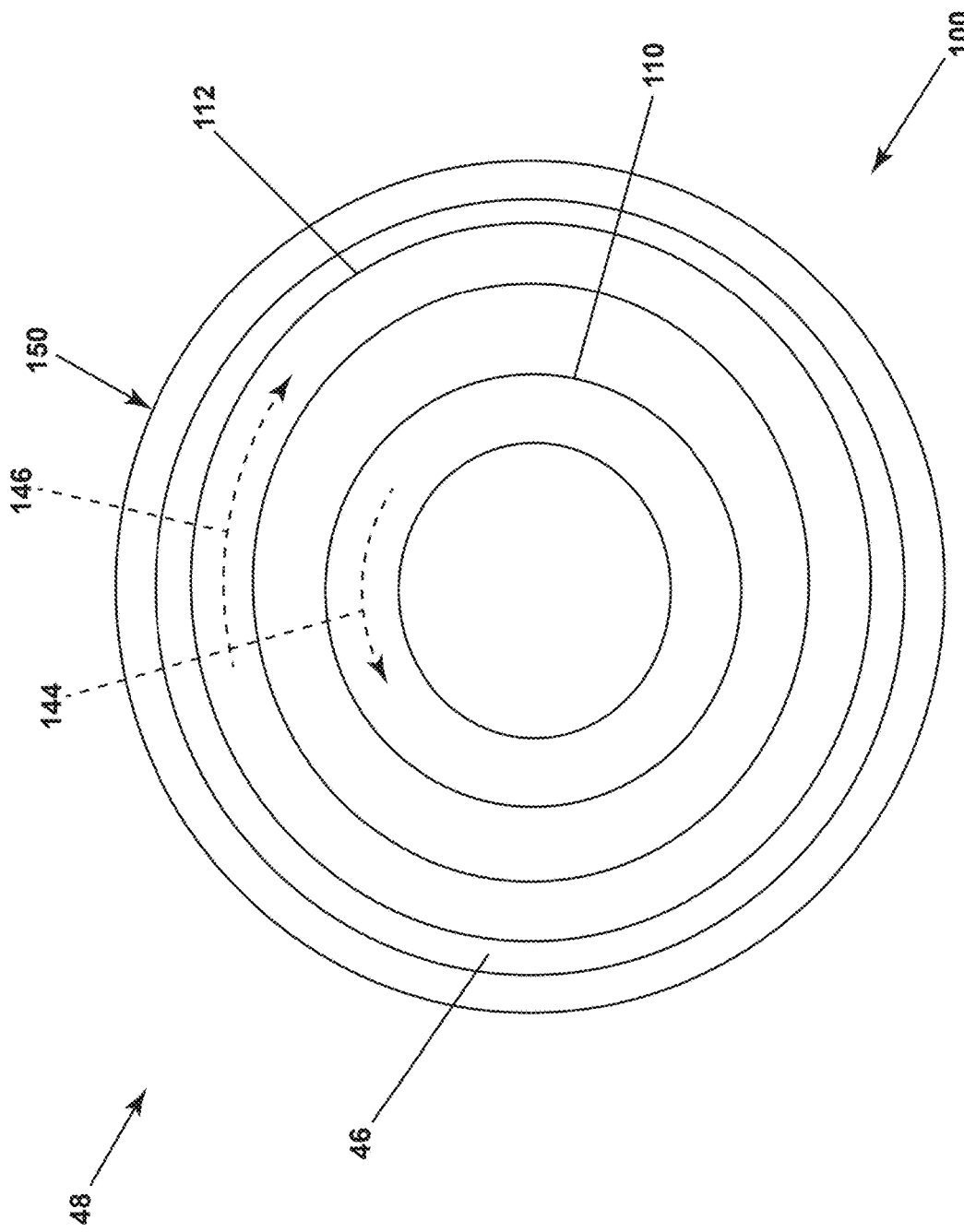
FIG. 6 is a schematic view illustrating portions of a fuel nozzle assembly, viewed from aft, in accordance with various aspects described herein.
Figure 7:
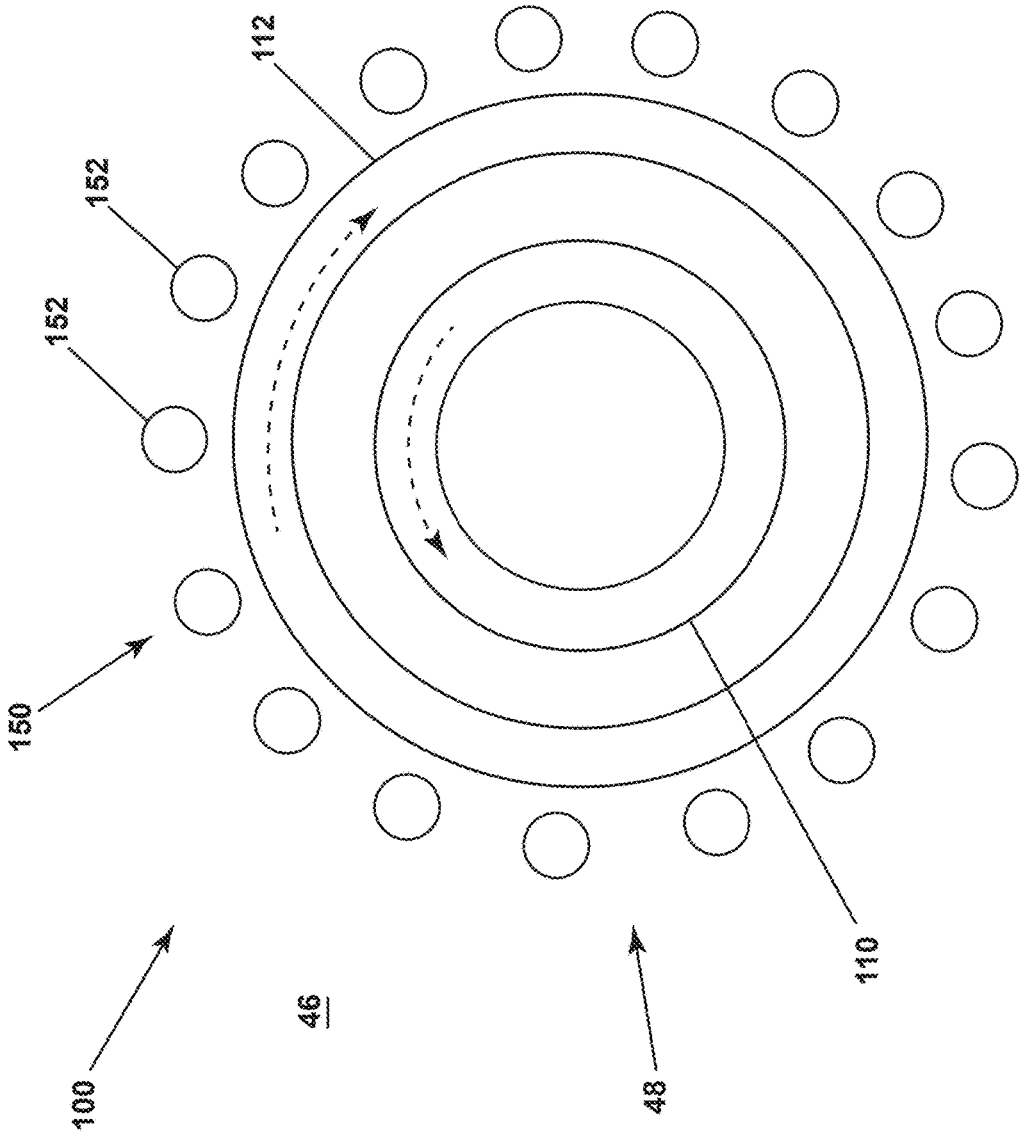
FIG. 7 is a schematic view illustrating portions of a fuel nozzle assembly, viewed from aft, in accordance with various aspects described herein.

The fuel nozzle assembly 48 can include an air passage 150 that extends through the wall 46 (e.g., a wall air passage) to provide air 70 to the combustion chamber 50. The air passage 150 can be radially outward of the second fluid passage 112, the output 116, or both. In some configurations, the air passage 150 is adjacent with the combustor liner 40, emits air 70 along the combustor liner 40, is parallel with the second axial direction A2, or combinations thereof. The flow of air 70 along the combustor liner 40 provided by the air passage 150 can increase fluid velocity along the combustor liner 40, which can limit flashback and flameholding along the combustor liner 40. Additionally or alternatively, the flow of air 70 along the combustor liner 40 provided by the air passage 150 can limit radial spread of flames in the combustion chamber 50, which can limit temperatures at the combustor liner 40. Referring to FIG. 6, the air passage 150 of the fuel nozzle assembly 48 can include an annular passage extending through the wall 46 radially outward of the first fluid passage 110 and the second fluid passage 112 of the mixer 100, at least at the wall 46. Referring to FIG. 7, the air passage 150 of the fuel nozzle assembly 48 can include a plurality of circumferentially spaced air passages 152 extending through the wall 46 radially outward of the first fluid passage 110 and the second fluid passage 112 of the mixer 100. In some examples, the wall 46 can be devoid of passages apart from the first fluid passage 110 and the second fluid passage 112 (see FIG. 3). Additionally or alternatively, in some examples, portions of the combustor liner 40 aligned with the fuel nozzle assembly 48 can be devoid of passages fluidly coupled with the combustion chamber 50 (see FIG. 3).

Figure 8:
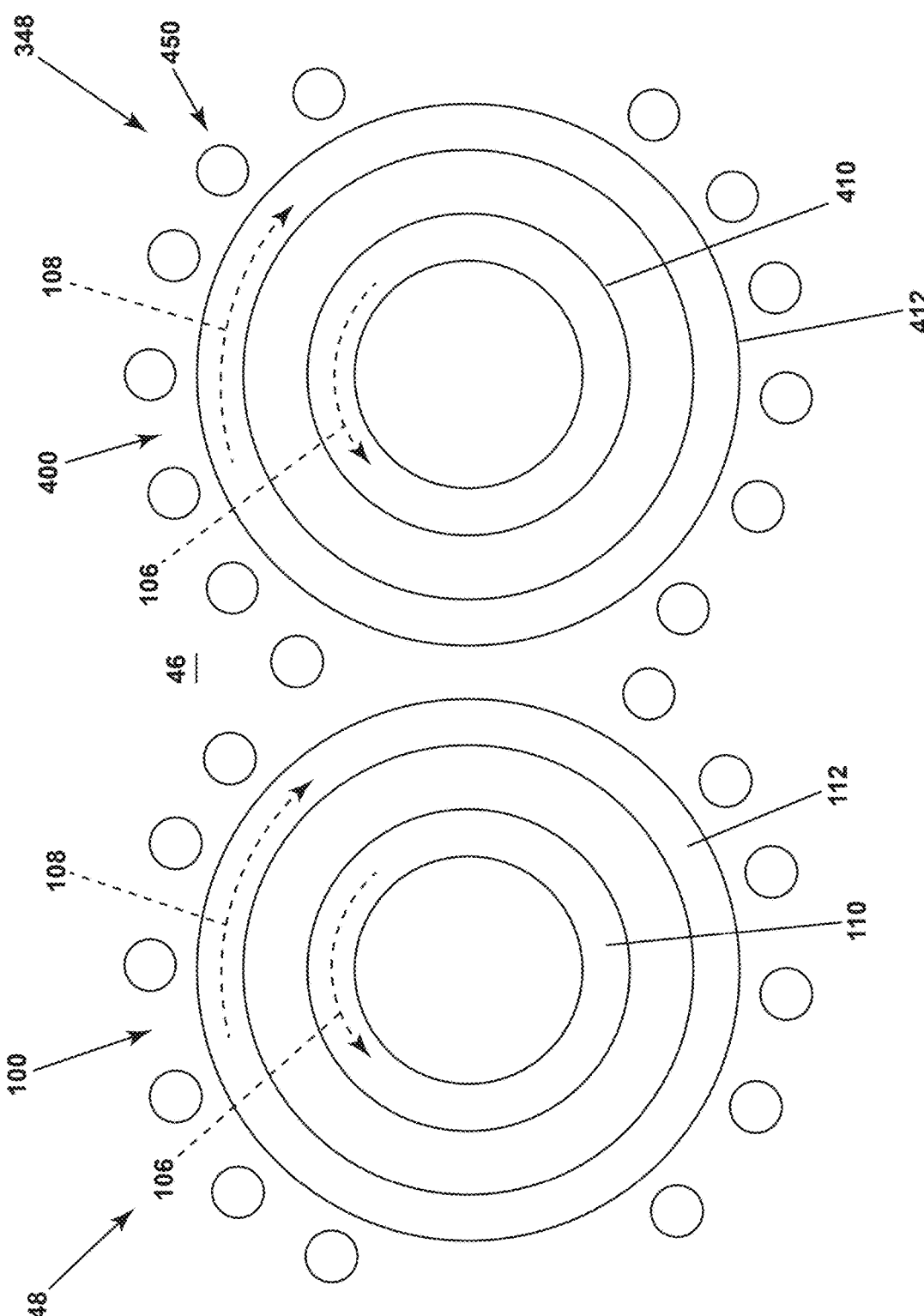
FIG. 8 is a schematic view illustrating portions of two fuel nozzle assemblies, viewed from aft, in accordance with various aspects described herein.
Figure 9:
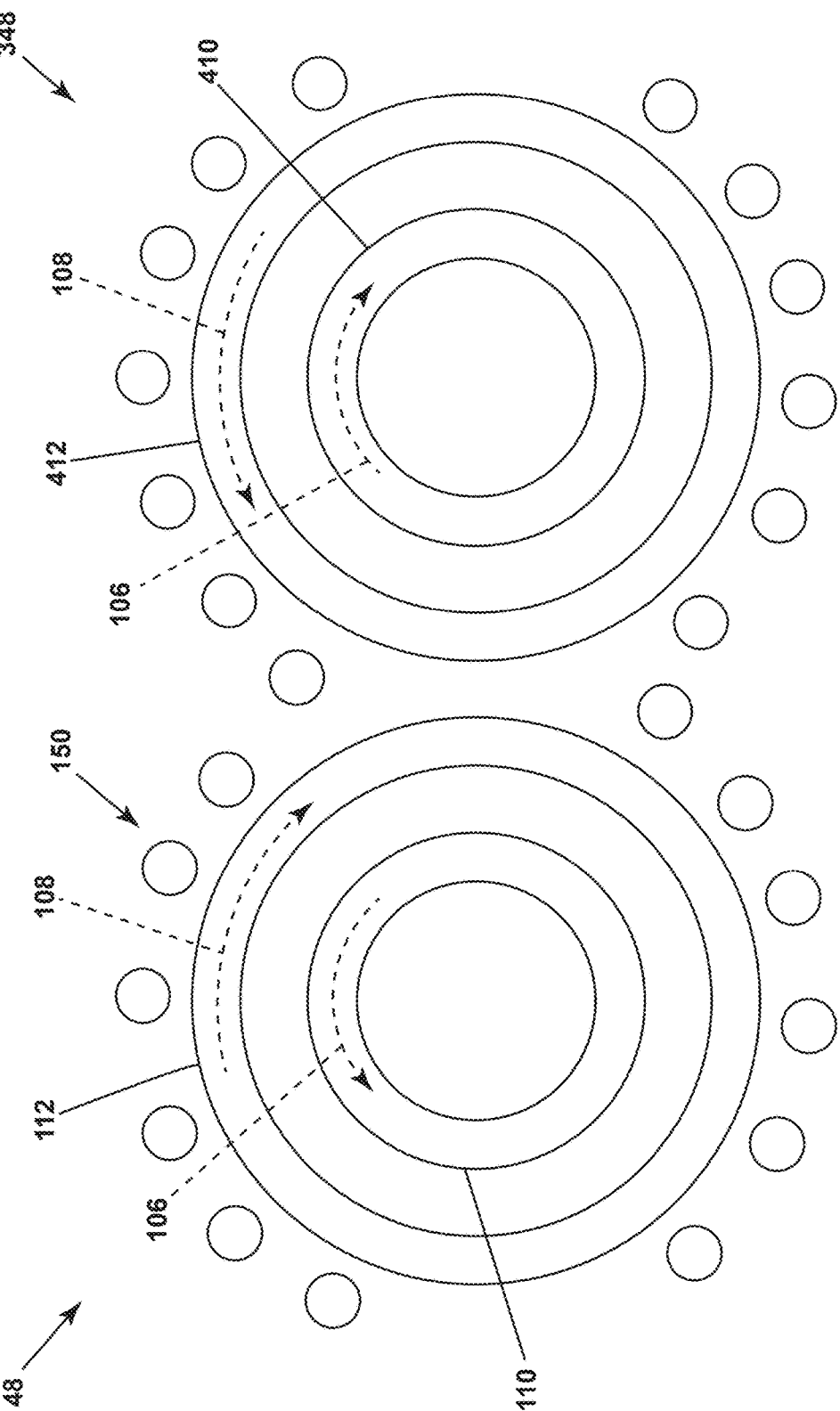
FIG. 9 is a schematic view illustrating portions of two fuel nozzle assemblies, viewed from aft, in accordance with various aspects described herein.

Referring to FIG. 8, in some examples, the fuel nozzle assembly 48 can be adjacent to a second fluid nozzle assembly 348 that can be configured in the same or a similar manner as the fuel nozzle assembly 48. For example, the second fluid nozzle assembly 348 can include a mixer 400, a first fluid passage 410 (e.g., a second nozzle rich fluid passage), a second fluid passage 412 (e.g., a second nozzle lean fluid passage), and an air passage 450. The first fluid passage 410 can provide the first fluid 106 to the combustion chamber 50 (FIG. 4). The second fluid passage 412 can provide the second fluid 108 to the combustion chamber 50 (FIG. 4). The first fluid passage 410 and the second fluid passage 412 can be annular with the second fluid passage 412 disposed radially outward of the first fluid passage 410, at least at the wall 46. In some examples, the first fluid passages 110, 410, the second fluid passages 112, 412, or combinations thereof can swirl fluid flowing therethrough, such as the first fluid 106 and the second fluid 108, respectively, such as via swirlers disposed therein (e.g., first and second swirlers 140, 142). With some examples, such as illustrated in FIG. 8, the swirl directions of the adjacent fuel nozzle assemblies 48, 348 and the mixers 100, 400 thereof can be in the same direction. For example, the swirl directions of the first fluid 106 from the first fluid passages 110, 410 can be counterclockwise and the swirl directions of the second fluid 108 from the second fluid passages 112, 412 can be clockwise. With other examples, such as illustrated in FIG. 9, the swirl direction of the first fluid 106 from the first fluid passage 110 of the mixer 100 of the fuel nozzle assembly 48 can be counterclockwise, the swirl direction of the first fluid 106 from the first fluid passage 410 of the mixer 400 of the fuel nozzle assembly 348 can be clockwise, the swirl direction of the second fluid 108 from the second fluid passage 112 can be clockwise, and the swirl direction of the second fluid 108 from the second fluid passage 412 can be counterclockwise. Adjacent fuel nozzle assemblies 48, 348 having opposite swirl directions can increase turbulence and facilitate mixing of the first and second fluids 106, 108 in the combustion chamber 50 (FIG. 4), which can reduce NOx emissions. The air passage 450 can be radially outward of the first and second fluid passages 410, 412.

Figure 10:
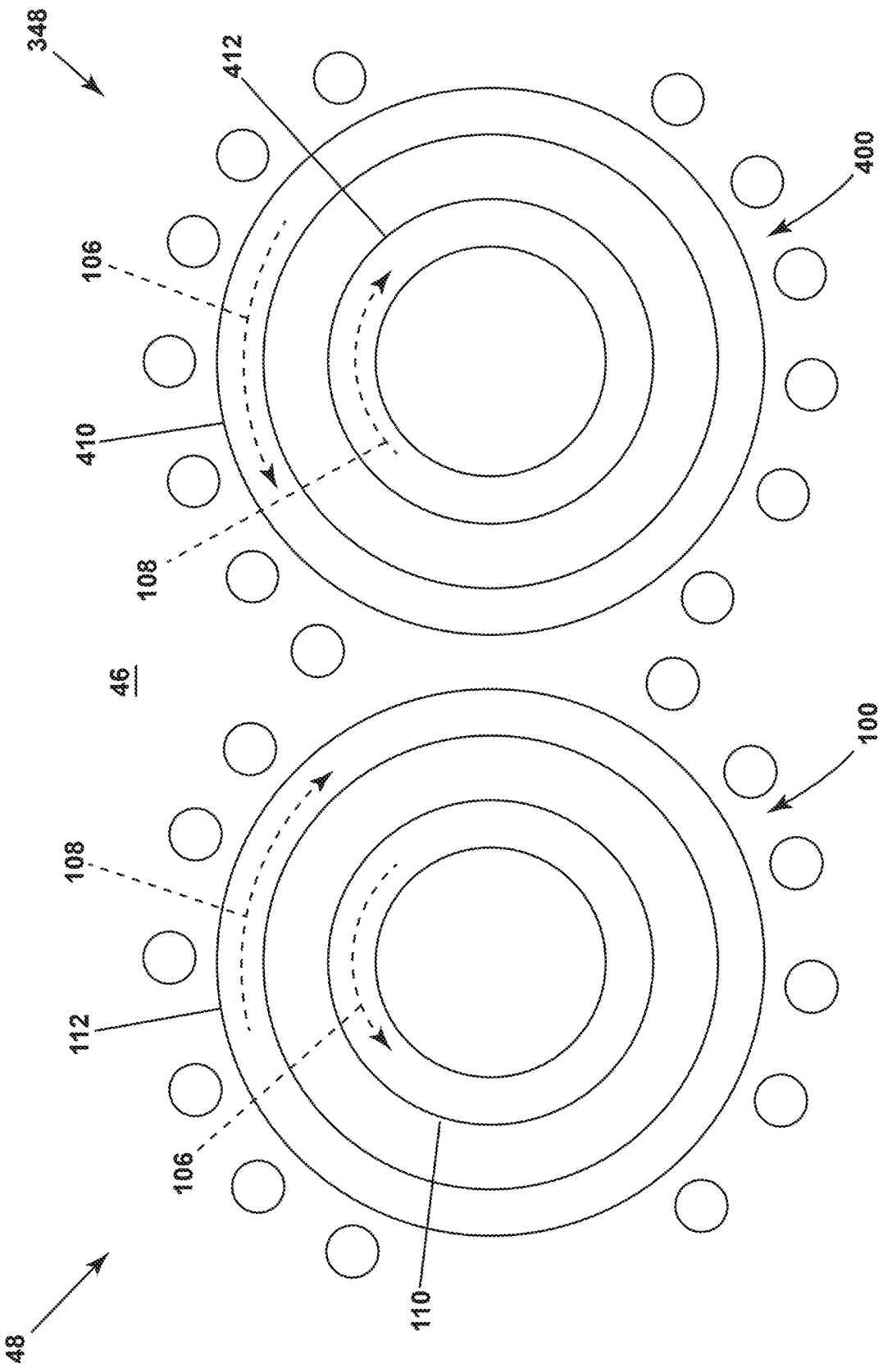
FIG. 10 is a schematic view illustrating portions of two fuel nozzle assemblies, viewed from aft, in accordance with various aspects described herein.

Referring to FIG. 10, in some examples, the first fluid passage 110 of the mixer 100 of the fuel nozzle assembly 48 can be radially inward of the second fluid passage 112, at least at the wall 46, and the first fluid passage 410 of the mixer 400 of the fuel nozzle assembly 348 can be disposed radially outward of the second fluid passage 412, at least at the wall 46 (e.g., adjacent fuel nozzle assemblies 48, 348 can include opposite fuel passage configurations). Such an opposite radial configuration of fuel passages can facilitate mixing of the first and second fluids 106, 108 in the combustion chamber 50 (FIG. 4), which can reduce NOx emissions. The outer fuel passages (e.g., the second fluid passage 112 and the first fluid passage 410) can have opposite swirl directions from each other. Additionally or alternatively, the inner fuel passages (e.g., the first fluid passage 110 and the second fluid passage 412) can have opposite swirl directions from each other. Opposite swirl directions can facilitate mixing of the first and second fluids 106, 108 in the combustion chamber 50 (FIG. 4), which can reduce NOx emissions.

Figure 11:
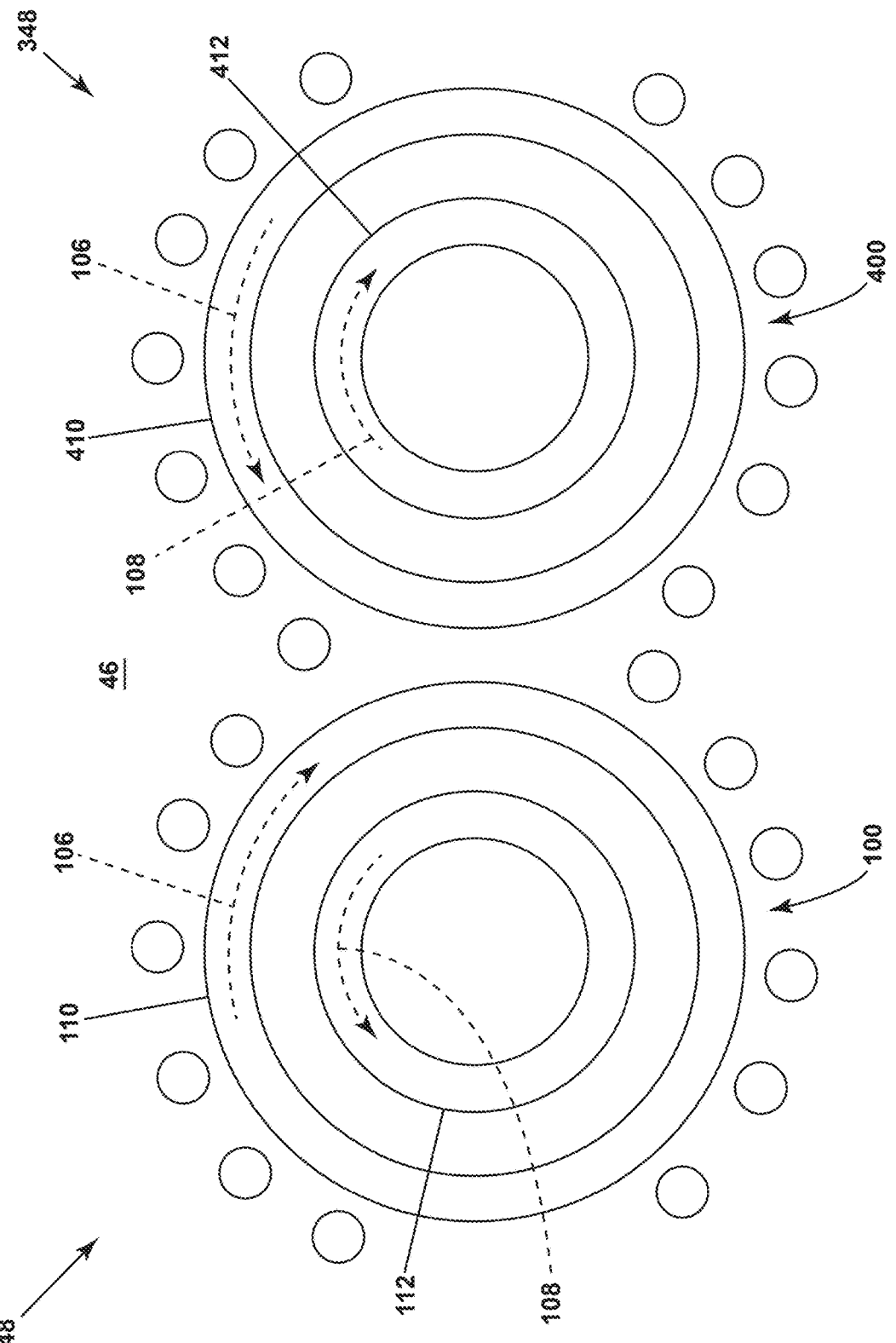
FIG. 11 is a schematic view illustrating portions of two fuel nozzle assemblies, viewed from aft, in accordance with various aspects described herein.

Referring to FIG. 11, in some examples, the first fluid passages 110, 410 of the mixers 100, 400 of adjacent fuel nozzle assemblies 48, 348 can be radially outward of the second fluid passages 112, 412, at least at the wall 46, to provide the first fluid 106 radially outward of the second fluid 108 from both of the adjacent fuel nozzle assemblies 48, 348. Such a configuration can increase flame stability. Some examples can include one or more pairs of adjacent fuel nozzle assemblies 48, 348 with first fluid passages 110, 410 outward of second fluid passages 112, 412 to increase flame stability and include more adjacent pairs of fuel nozzle assemblies 48, 348 with second fluid passages 112, 412 outward of first fluid passages 110, 410 to decrease NOx emissions. The swirl directions of the fuel nozzle assemblies 48, 348 can be opposite to increase mixing. For example, the swirl direction of the first fluid passage 110 can be clockwise, the swirl direction of the first fluid passage 410 can be counterclockwise, the swirl direction of the second fluid passage 112 can be counterclockwise, and the swirl direction of the second fluid passage 412 can be clockwise. In some examples, the swirl directions of the first fluid passage 110, 410 and the second fluid passage 112, 412 of the same fuel nozzle assembly 48, 348 can be the same direction.

Figure 12:
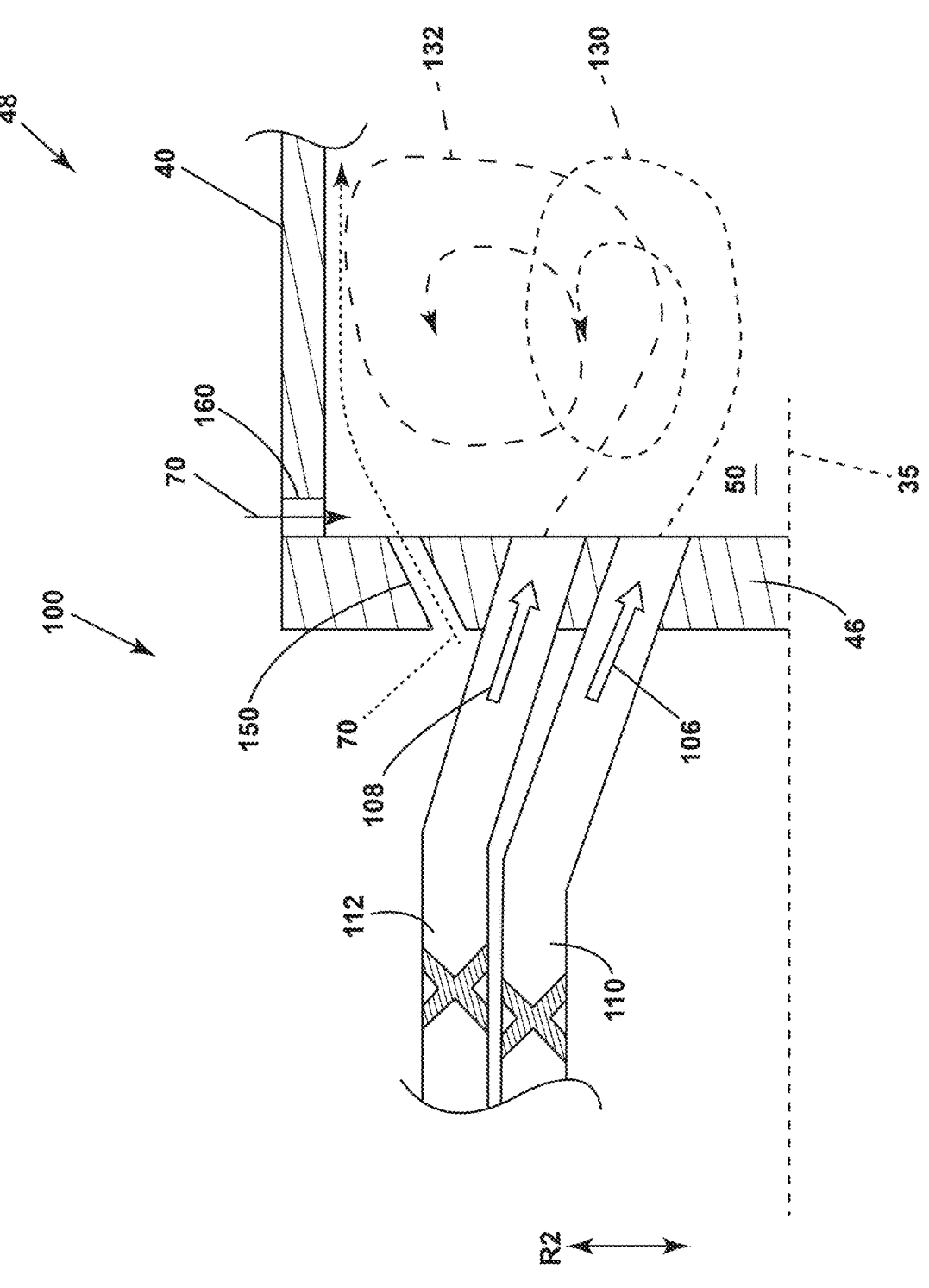
FIG. 12 is a schematic cross-sectional view illustrating portions of a fuel nozzle assembly coupled to a combustion chamber in accordance with various aspects described herein.

Referring to FIG. 12, the first fluid passage 110 and the second fluid passage 112 of the mixer 100 of the fuel nozzle assembly 48 can extend radially inward, relative to the fuel nozzle assembly centerline 35, with the second fluid passage 112 disposed radially outward of the first fluid passage 110, at least at the wall 46. The first fluid passage 110 and the second fluid passage 112 can extend radially inward at the same angle or at different angles. With such a configuration of the first and second fluid passages 110, 112, flows of the first fluid 106 and the second fluid 108 can be concentrated toward and mix along the fuel nozzle assembly centerline 35, and the first recirculation 130 and the second recirculation 132 can have inside-out configurations. The inside-out configuration can provide longer mixing times as the first fluid 106 and the second fluid 108 flow longer radial distances, compared to axial configurations. The longer mixing times can allow for increased mixing of the first fluid 106 and the second fluid 108 with relatively shorter axial lengths of the combustion chamber 50. The fuel nozzle assembly 48 and the combustion chamber 50 can be configured such that the first recirculation 130 (e.g., a first inside-out recirculation) overlaps with the second recirculation 132 (e.g., a second inside-out recirculation) in the combustion chamber 50 to facilitate mixing of the first fluid 106 and the second fluid 108. The air passage 150 can be disposed radially outward of the second fluid passage 112 and can extend radially outward such that air 70 is directed onto the combustor liner 40, which can limit or prevent flames from scrubbing the combustor liner 40. The combustor liner 40 can include a second air passage 160 (e.g., a liner air passage). The second air passage 160 can direct air 70 toward, along, or both, the wall 46, which can limit temperatures at the wall 46. The second air passage 160 can be provided as a single air passage or a plurality of air passages, some or all of which can be circumferentially offset from the air passages 152 (FIG. 7). Offsetting the air passages of the second air passage 160 from the air passages 152 (FIG. 7) can limit interference between air 70 flowing through the air passage 152 to the combustor liner 40 and air 70 flowing through the second air passage 160 toward or along the wall 46. The second air passage 160 can be adjacent the wall 46. The second air passage 160 can be parallel with the second radial direction R2 or can extend toward the wall 46 (e.g., forward), at least to some extent.

Figure 13:
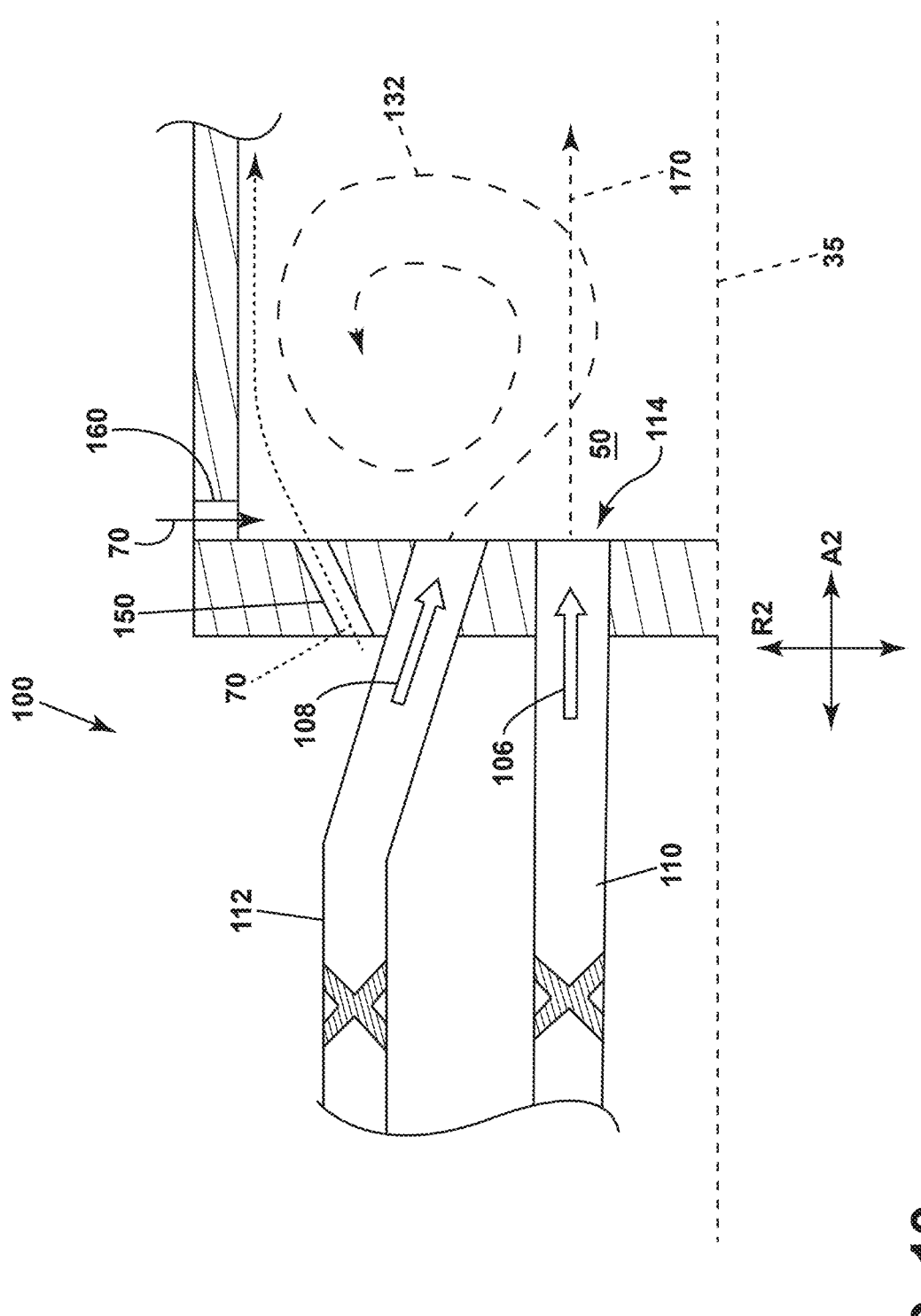
FIG. 13 is a schematic cross-sectional view illustrating portions of a fuel nozzle assembly coupled to a combustion chamber in accordance with various aspects described herein.

Referring to FIG. 13, the first fluid passage 110 of the mixer 100 can be parallel to the second axial direction A2 and the second fluid passage 112 can extend radially inward to emit the second fluid 108 toward the fuel nozzle assembly centerline 35, toward the first fluid 106 emitted by the first fluid passage 110, or both. With such a configuration, the second fluid 108 from the second fluid passage 112 can impinge on the first fluid 106 from the first fluid passage 110 in the combustion chamber 50 to increase mixing between the first fluid 106 and the second fluid 108. The output 114 of the first fluid passage 110 can be offset from the fuel nozzle assembly centerline 35 such that the first fluid passage 110 emits the first fluid 106 around the fuel nozzle assembly centerline 35 and not directly along the fuel nozzle assembly centerline 35. The first fluid passage 110 being parallel to the second axial direction A2 can limit or prevent recirculation of the first fluid 106 in the combustion chamber 50. For example, the first fluid 106 can be provided as an axial stream 170. The second fluid passage 112 can emit the second fluid 108 to the combustion chamber 50 such that the recirculation of the second fluid 108 (e.g., the second recirculation 132) has an inside-out configuration that intersects with the axial stream 170 to facilitate mixing of the first fluid 106 with the second fluid 108. The air passage 150 and the second air passage 160 can emit air 70 into the combustion chamber 50.

Figure 14:
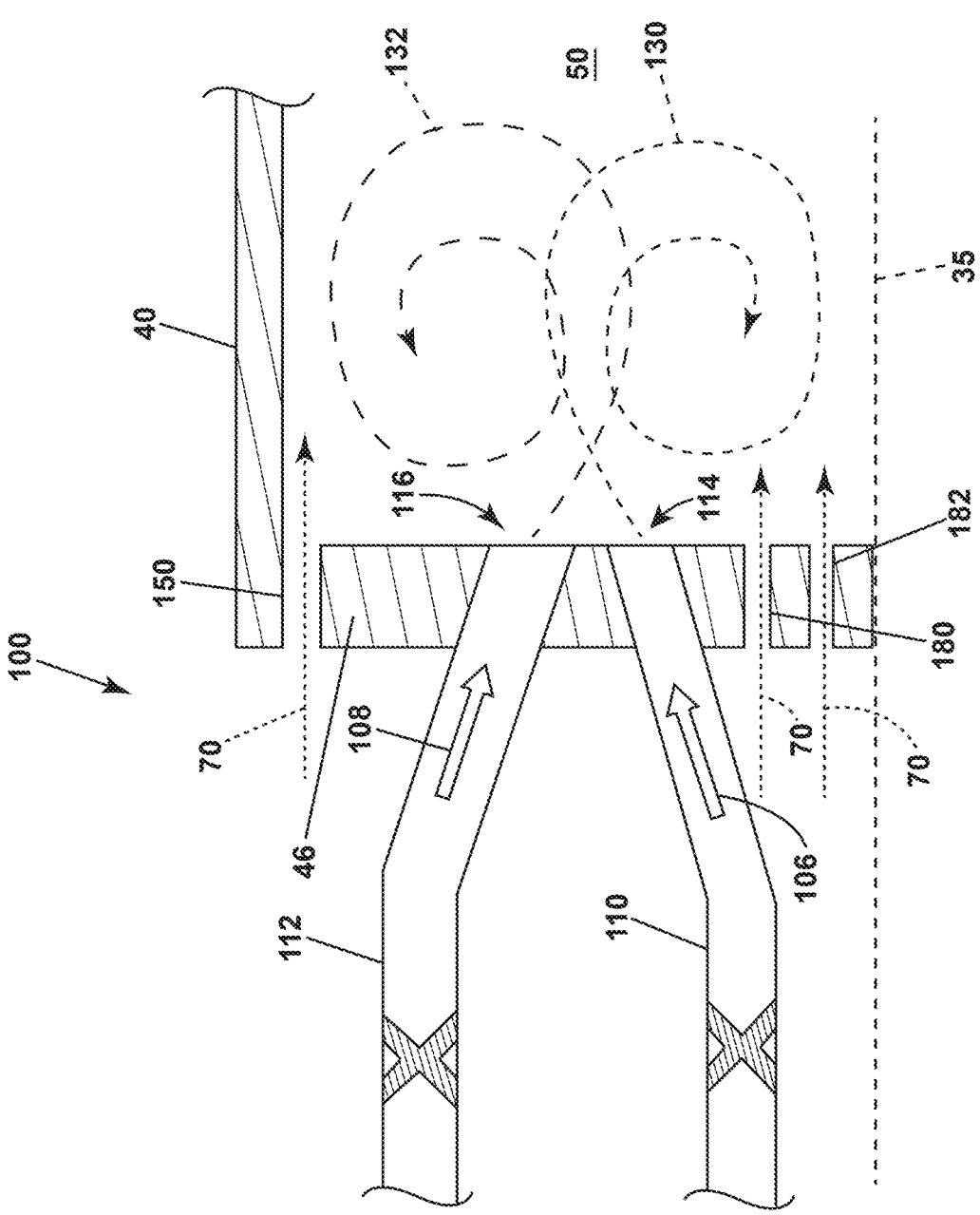
FIG. 14 is a schematic cross-sectional view illustrating portions of a fuel nozzle assembly coupled to a combustion chamber in accordance with various aspects described herein.

Referring to FIG. 14, the first fluid passage 110 of the mixer 100 can extend radially outward and the second fluid passage 112 can extend radially inward. For example, the first fluid passage 110 and the second fluid passage 112 can be disposed in an impinging configuration such that the first fluid 106 emitted from the first fluid passage 110 and the second fluid 108 emitted from the second fluid passage 112 impinge in the combustion chamber 50 to facilitate mixing of the first fluid 106 and the second fluid 108. The first recirculation 130 of the first fluid 106 is illustrated with an outside-in configuration. The second recirculation 132 of the second fluid 108 is illustrated with an inside-out configuration that intersects and overlaps with the first recirculation 130 (e.g., an outside-in recirculation) in the combustion chamber 50 to facilitate mixing of the first fluid 106 and the second fluid 108. The wall 46 can include one or more air passages fluidly coupled with combustion chamber 50, such as the air passage 150 (e.g., a first wall air passage), a second wall air passage 180, a third wall air passage 182, or a combination thereof. The air passage 150 can be adjacent the combustor liner 40 to emit air 70 along and limit temperatures at the combustor liner 40. The second wall air passage 180 and the third wall air passage 182 can be radially inward of the outputs 114, 116 of the first and second fluid passages 110, 112 and can be radially outward of the fuel nozzle assembly centerline 35. The second and third wall air passages 180, 182 can comprise single annular passages or pluralities of circumferentially spaced air passages and can provide air 70 to the combustion chamber 50, such as to cool the wall 46. The second and third wall air passages 180, 182 can provide air 70 to the combustion chamber 50 to limit recirculation of the first and second fluids 106, 108 at the fuel nozzle assembly centerline 35, which can protect the wall 46.

Figure 15:
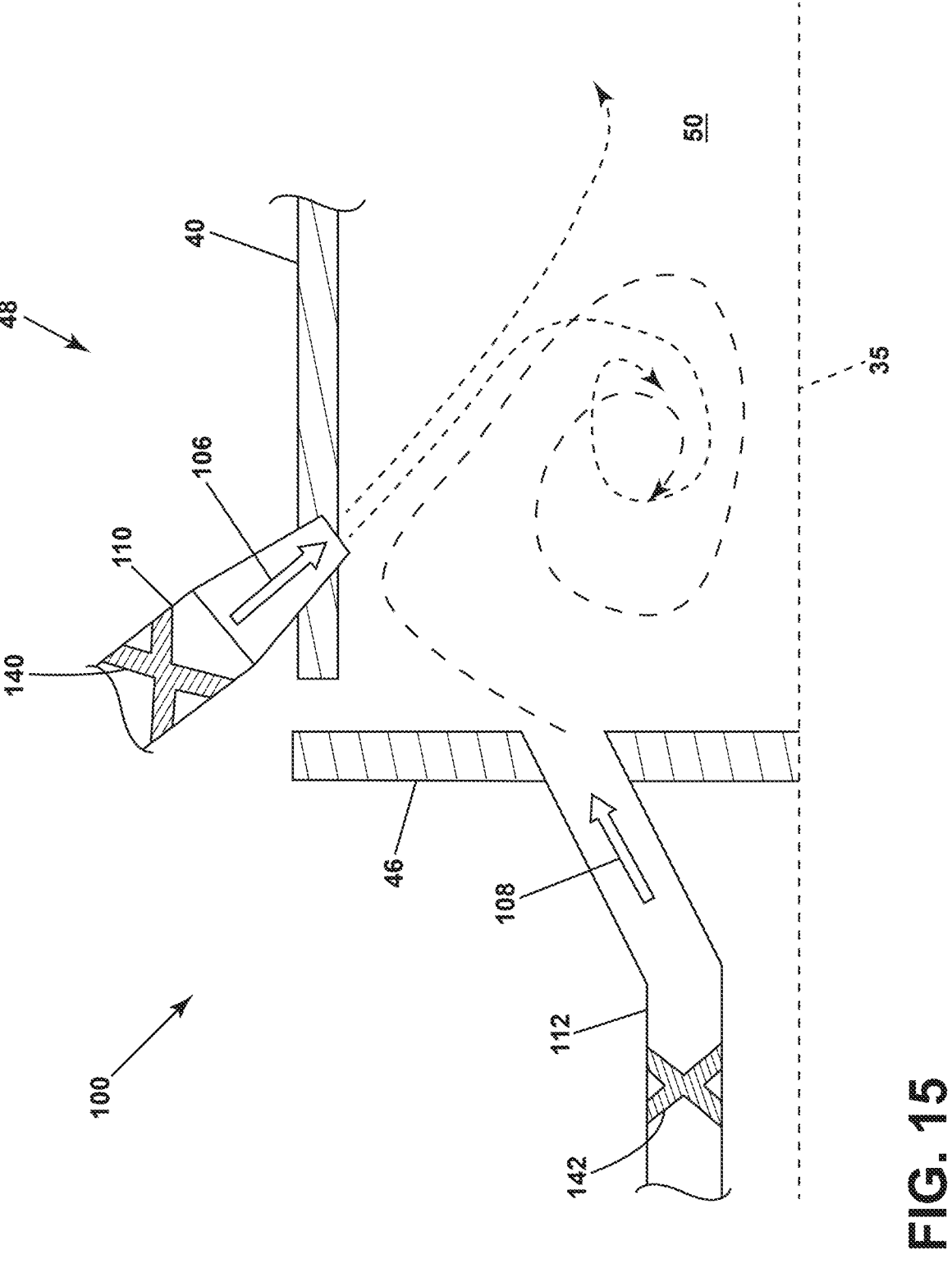
FIG. 15 is a schematic cross-sectional view illustrating portions of a fuel nozzle assembly coupled to a combustion chamber in accordance with various aspects described herein.

Referring to FIG. 15, the first fluid passage 110 of the mixer 100 of the fuel nozzle assembly 48 can be coupled to the combustor liner 40 to provide the first fluid 106 through the combustor liner 40 and into the combustion chamber 50. The first fluid passage 110 can be angled forward, at least to some degree, such that the first fluid 106 emitted from the first fluid passage 110 flows radially inward toward the fuel nozzle assembly centerline 35 and aft away from the wall 46. The second fluid passage 112 can be coupled to the wall 46 to provide the second fluid 108 through the wall 46 and into the combustion chamber 50. The second fluid passage 112 can be angled radially outward away from the fuel nozzle assembly centerline 35 such that the second fluid 108 emitted from the second fluid passage 112 intersects with the first fluid 106 emitted from the first fluid passage 110 aft of the wall 46, such as farther aft than in configurations with the first fluid passage 110 coupled to the wall 46. The first fluid passage 110 coupled to the combustor liner 40 aft of the wall 46 can provide rapid mixing between the first fluid 106 and the second fluid 108 aft of the wall 46, which can reduce NOx emissions. The first fluid passage 110 can include the first swirler 140 and the second fluid passage 112 can include the second swirler 142.

Figure 16:
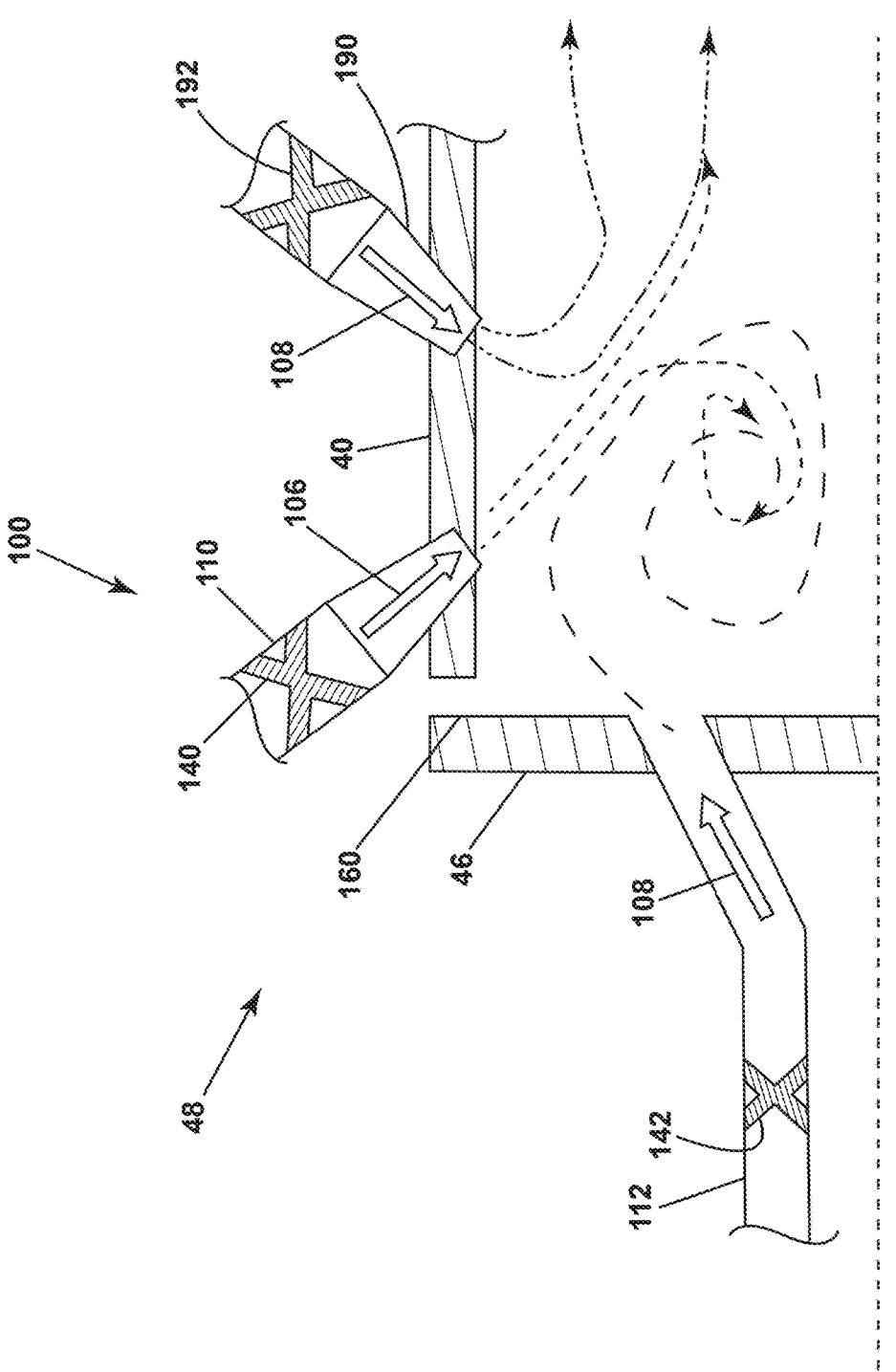
FIG. 16 is a schematic cross-sectional view illustrating portions of a fuel nozzle assembly coupled to a combustion chamber in accordance with various aspects described herein.

In some examples, such as illustrated in FIG. 16, the mixer 100 of the fuel nozzle assembly 48 can further comprise a third fluid passage 190. The third fluid passage 190 can be fluidly coupled with the second fluid supply 104 (FIG. 3) to provide the second fluid 108 into the combustion chamber 50 (e.g., the third fluid passage 190 can be a second lean fluid passage). The third fluid passage 190 can be coupled to the combustor liner 40 aft of the first fluid passage 110, can be angled aft, at least to some degree, to emit the second fluid 108 radially inward and forward toward the wall 46, or both. For example, the first fluid passage 110 and the third fluid passage 190 can be coupled to the combustor liner 40 and disposed in an impinging configuration such that the first fluid 106 emitted from the first fluid passage 110 and the second fluid 108 emitted from the third fluid passage 190 impinge in the combustion chamber 50 to facilitate mixing of the first fluid 106 and the second fluid 108. The impinging first and second fluids 106, 108 from the first and third fluid passages 110, 190 can also interact and mix with the second fluid 108 from the second fluid passage 112 coupled to the wall 46 to further improve mixing of the first fluid 106 and the second fluid 108. At least to some extent, the second fluid passage 112 and the third fluid passage 190 can be disposed in an opposing configuration in which at least some of the second fluid 108 emitted from the second fluid passage 112 flows radially outward and aft toward the third fluid passage 190 and at least some of the second fluid 108 emitted from the third fluid passage 190 flows radially inward and forward toward the second fluid passage 112, which can increase turbulence to facilitate mixing of the second fluid 108 with the first fluid 106. The first fluid passage 110 can include the first swirler 140, the second fluid passage 112 can include the second swirler 142, and the third fluid passage 190 can include a third passage swirler 192. The swirl numbers of the first fluid passage 110 and the third fluid passage 190 (e.g., liner passages) can be lower than the swirl number of the second fluid passage 112 (e.g., a wall passage), which can limit the spread of the first fluid 106 and the second fluid 108 along the combustor liner 40 to limit combustible zones at or proximate the combustor liner 40, limiting wear of the combustor liner 40. In some examples, the first fluid passage 110, the third fluid passage 190, or both, do not include swirlers. The second air passage 160 can extend through the combustor liner 40 forward of the first fluid passage 110 and the third fluid passage 190.

Figure 17:
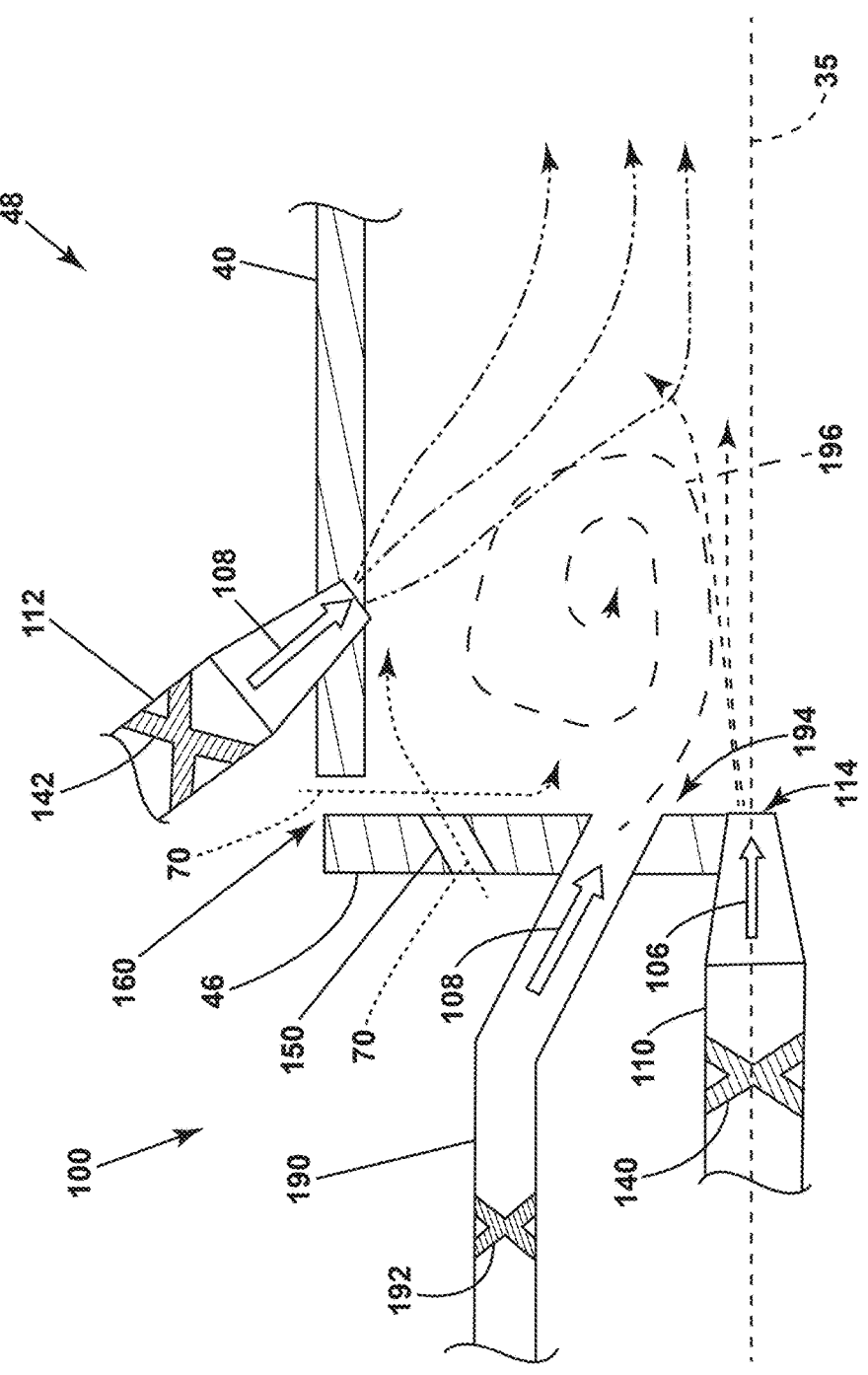
FIG. 17 is a schematic cross-sectional view illustrating portions of a fuel nozzle assembly coupled to a combustion chamber in accordance with various aspects described herein.

Referring to FIG. 17, the mixer 100 of the fuel nozzle assembly 48 can include the first fluid passage 110 coupled to the wall 46, the second fluid passage 112 coupled to the combustor liner 40, and the third fluid passage 190 coupled to the wall 46. The first fluid passage 110, the output 114, or both, can be aligned with the fuel nozzle assembly centerline 35. The second fluid passage 112 can be angled radially inward and forward to emit the second fluid 108 radially inward and aft away from the wall 46. The third fluid passage 190 can be angled radially inward, at least to some degree, and the output 194 can be radially outward of the output 114. The second fluid 108 emitted from the second fluid passage 112 interacts and mixes with the recirculation of the second fluid 108 from the third fluid passage 190 (e.g., a third passage recirculation 196) and the first fluid 106 emitted from the first fluid passage 110 to facilitate mixing of the first fluid 106 and the second fluid 108. The fuel nozzle assembly 48 can include the air passage 150 to emit air 70 toward and along the combustor liner 40, the combustor liner 40 can include the second air passage 160 to emit air 70 along the wall 46, or both, such as to cool the combustor liner 40 and the wall 46. The first fluid passage 110 can include the first swirler 140, the second fluid passage 112 can include the second swirler 142, and the third fluid passage 190 can include the third passage swirler 192.

The swirl numbers of the first fluid passage 110 and the third fluid passage 190 can be lower than the swirl number of the second fluid passage 112. In some examples, the first fluid passage 110, the third fluid passage 190, or both, do not include swirlers.

Figure 18:
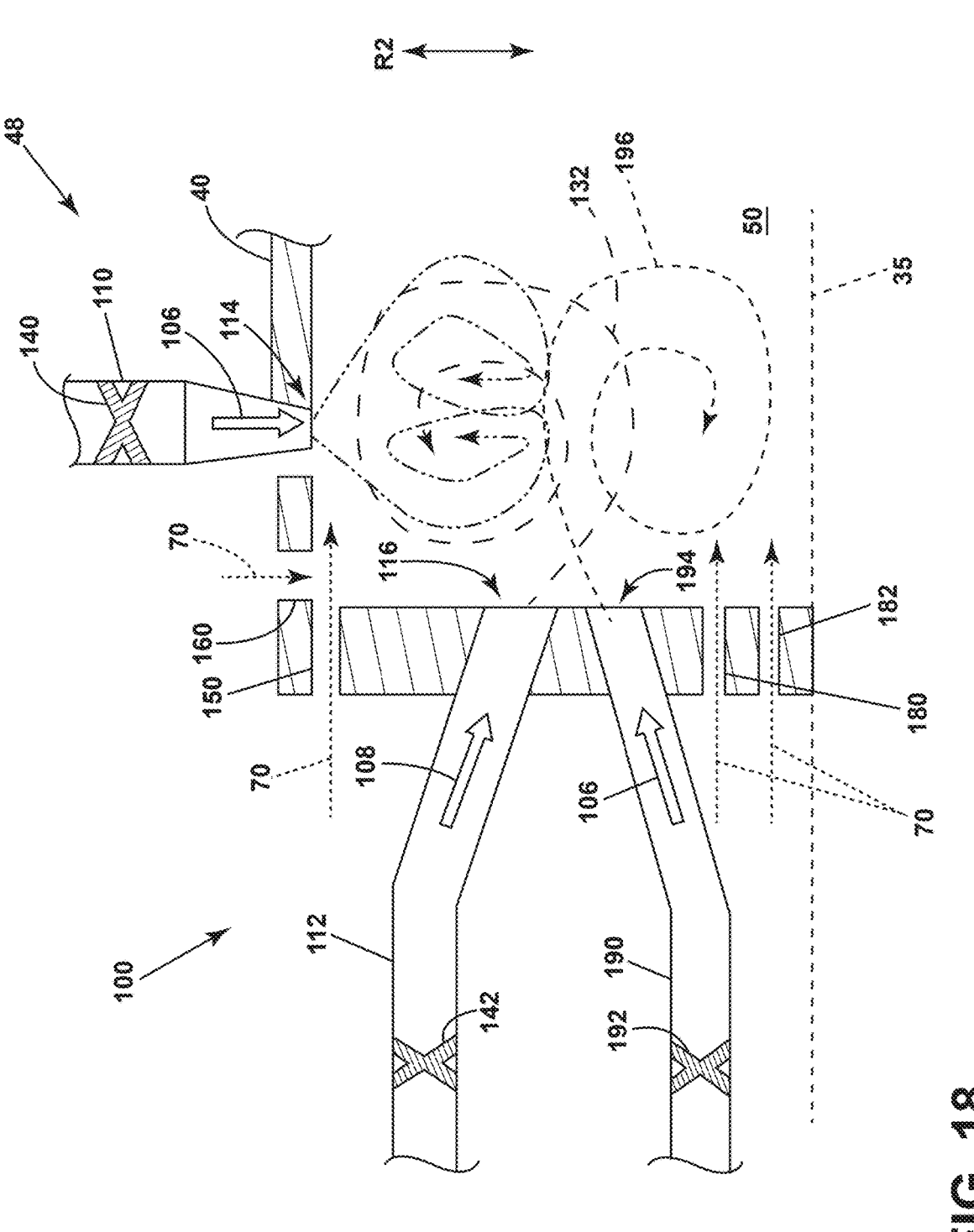
FIG. 18 is a schematic cross-sectional view illustrating portions of a fuel nozzle assembly coupled to a combustion chamber in accordance with various aspects described herein.

Referring to FIG. 18, the mixer of the fuel nozzle assembly 48 can include the second fluid passage 112 and the third fluid passage 190 coupled to the wall 46 and can include the first fluid passage 110 coupled to the combustor liner 40. The first fluid passage 110 and the third fluid passage 190 can be fluidly coupled to the first fluid supply 102 (FIG. 3) to emit the first fluid 106 into the combustion chamber 50. The second fluid passage 112 can be fluidly coupled to the second fluid supply 104 (FIG. 3) to emit the second fluid 108 into the combustion chamber 50. For example, the fuel nozzle assembly 48 can include the first and third fluid passages 110, 190 provided as two rich fluid passages, with one coupled to the wall 46 and one coupled to the combustor liner 40. The third fluid passage 190 can be angled radially outward, at least to some degree, to emit the first fluid 106 away from the fuel nozzle assembly centerline 35, toward the combustor liner 40, and aft of the wall 46. The second fluid passage 112 can be angled radially inward, at least to some degree, to emit the second fluid 108 toward the fuel nozzle assembly centerline 35, away from the combustor liner 40, and aft of the wall 46. The output 116 of the second fluid passage 112 can be radially outward of the output 194 of the third fluid passage 190. For example, the third fluid passage 190 and the second fluid passage 112 can be disposed in an impinging configuration such that the first fluid 106 emitted from the third fluid passage 190 and the second fluid 108 emitted from the second fluid passage 112 impinge on each other in the combustion chamber 50 aft of the wall 46 to facilitate mixing of the first fluid 106 and the second fluid 108. The first fluid passage 110 can be perpendicular to the combustor liner 40 (e.g., parallel with the second radial direction R2) to emit the first fluid 106 toward the fuel nozzle assembly centerline 35. The third passage recirculation 196 provided via the third fluid passage 190, the second recirculation 132 provided via the second fluid passage 112, or both, intersect and mix with the first fluid 106 emitted from the first fluid passage 110 to facilitate mixing of the first fluid 106 with the second fluid 108. Providing the first fluid 106 via the first fluid passage 110 and the third fluid passage 190 can increase flame stability. The fuel nozzle assembly 48 can include the air passage 150 radially outward of the outputs 194, 116, can include the second wall air passage 180 radially inward of the outputs 194, 116, can include the third wall air passage 182 radially inward of the second wall air passage 180, or combinations thereof, to provide air 70 to the combustion chamber 50. Additionally or alternatively, the combustor liner 40 can include the second air passage 160, such as to provide air 70 along the wall 46. The first fluid passage 110 can include the first swirler 140, the second fluid passage 112 can include the second swirler 142, and the third fluid passage 190 can include the third passage swirler 192. The swirl numbers of the first fluid passage 110 and the third fluid passage 190 can be lower than the swirl number of the second fluid passage 112. In some examples, the first fluid passage 110, the third fluid passage 190, or both, do not include swirlers.

Figure 19:
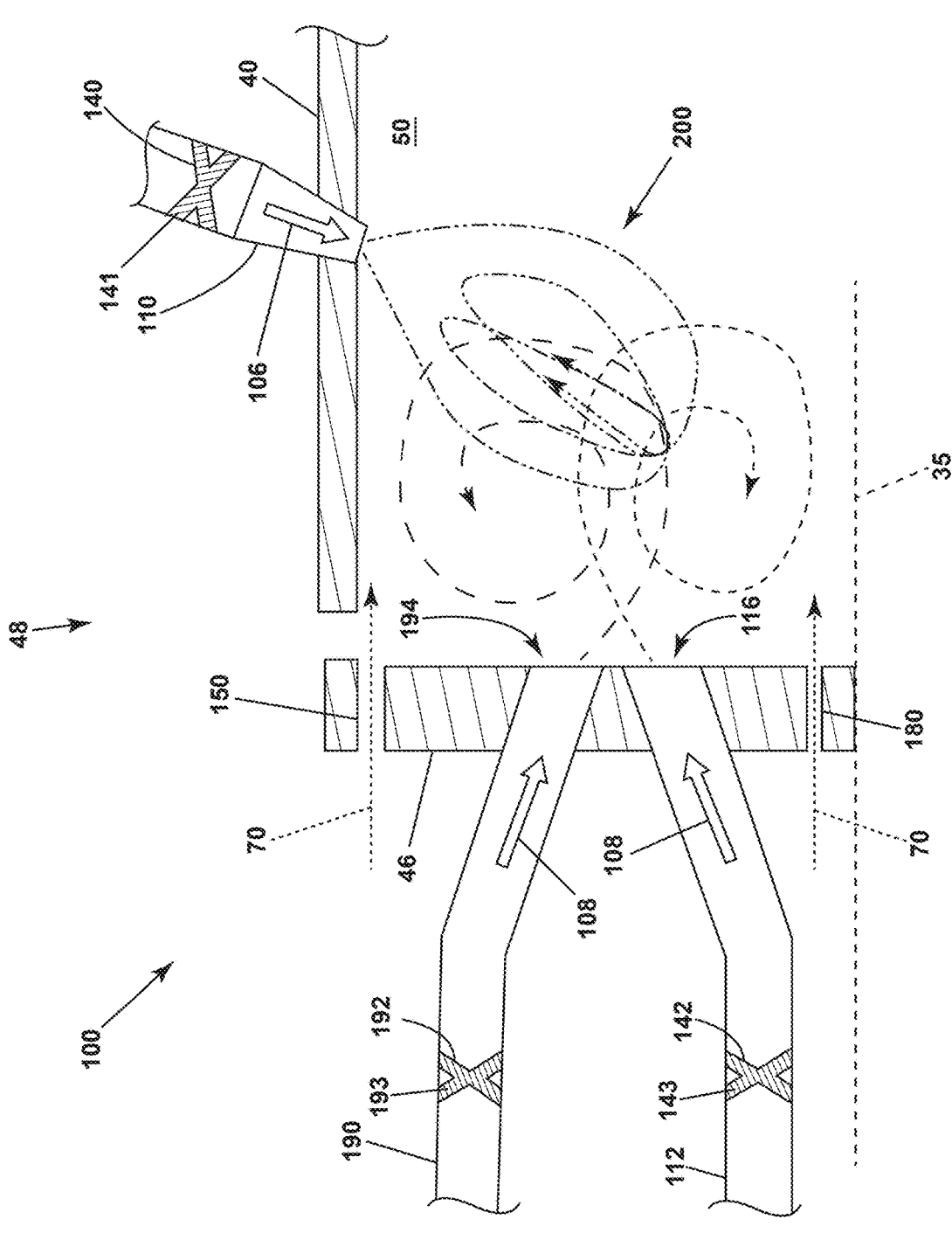
FIG. 19 is a schematic cross-sectional view illustrating portions of a fuel nozzle assembly coupled to a combustion chamber in accordance with various aspects described herein.

Referring to FIG. 19, the mixer 100 of the fuel nozzle assembly 48 can include the first fluid passage 110 coupled to the combustor liner 40, the second fluid passage 112 coupled to the wall 46, and the third fluid passage 190 coupled to the wall 46. The first fluid passage 110 can be fluidly coupled with the first fluid supply 102 (FIG. 3) to emit the first fluid 106 into the combustion chamber 50. The second fluid passage 112 and the third fluid passage 190 can be fluidly coupled with the second fluid supply 104 (FIG. 3) to emit the second fluid 108 into the combustion chamber 50. The first fluid passage 110 can be angled aft, at least to some degree, such that the first fluid passage 110 emits the first fluid 106 forward and radially inward into the combustion chamber 50. The second fluid passage 112 can be angled radially outward, at least to some degree, to emit the first fluid 106 away from the fuel nozzle assembly centerline 35, toward the combustor liner 40, and aft of the wall 46. The third fluid passage 190 can be angled radially inward, at least to some degree, to emit the second fluid 108 toward the fuel nozzle assembly centerline 35, away from the combustor liner 40, and aft of the wall 46. The output 116 of the second fluid passage 112 can be radially inward of an output 194 of the third fluid passage 190. For example, the second fluid passage 112 and the third fluid passage 190 can be disposed in an impinging configuration such that the second fluid 108 emitted from the second fluid passage 112 and the second fluid 108 emitted from the third fluid passage 190 impinge on each other in the combustion chamber 50 aft of the wall 46. This impingement can create turbulence and a shear region which facilitate mixing of the second fluid 108 with air 70, mixing of the first fluid 106 (e.g., from the first fluid passage 110) with air 70, or both. The first fluid 106 can flow from the first fluid passage 110 into the impinging second fluid 108 from the second and third fluid passages 112, 190 to create a region of rapid mixing 200 in the combustion chamber 50. The fuel nozzle assembly 48 can include the air passage 150, which can extend through the wall 46 adjacent the combustor liner 40 to emit air 70 along the combustor liner 40. Additionally or alternatively, the fuel nozzle assembly 48 can include the second wall air passage 180 that can be disposed radially inward of the output 116 and radially outward of the fuel nozzle assembly centerline 35. The first fluid passage 110 can include the first swirler 140, the second fluid passage 112 can include the second swirler 142, and the third fluid passage 190 can include the third passage swirler 192. Swirlers, such as the first swirler 140, the second swirler 142, and the third passage swirler 192, can include a plurality of circumferentially spaced vanes 141, 143, 193. The swirl number of the first fluid passage 110 can be lower than the swirl numbers of the second fluid passage 112 and the third fluid passage 190, which can be equal or not equal. In some examples, the first fluid passage 110 does not include a swirler.

Figure 20:
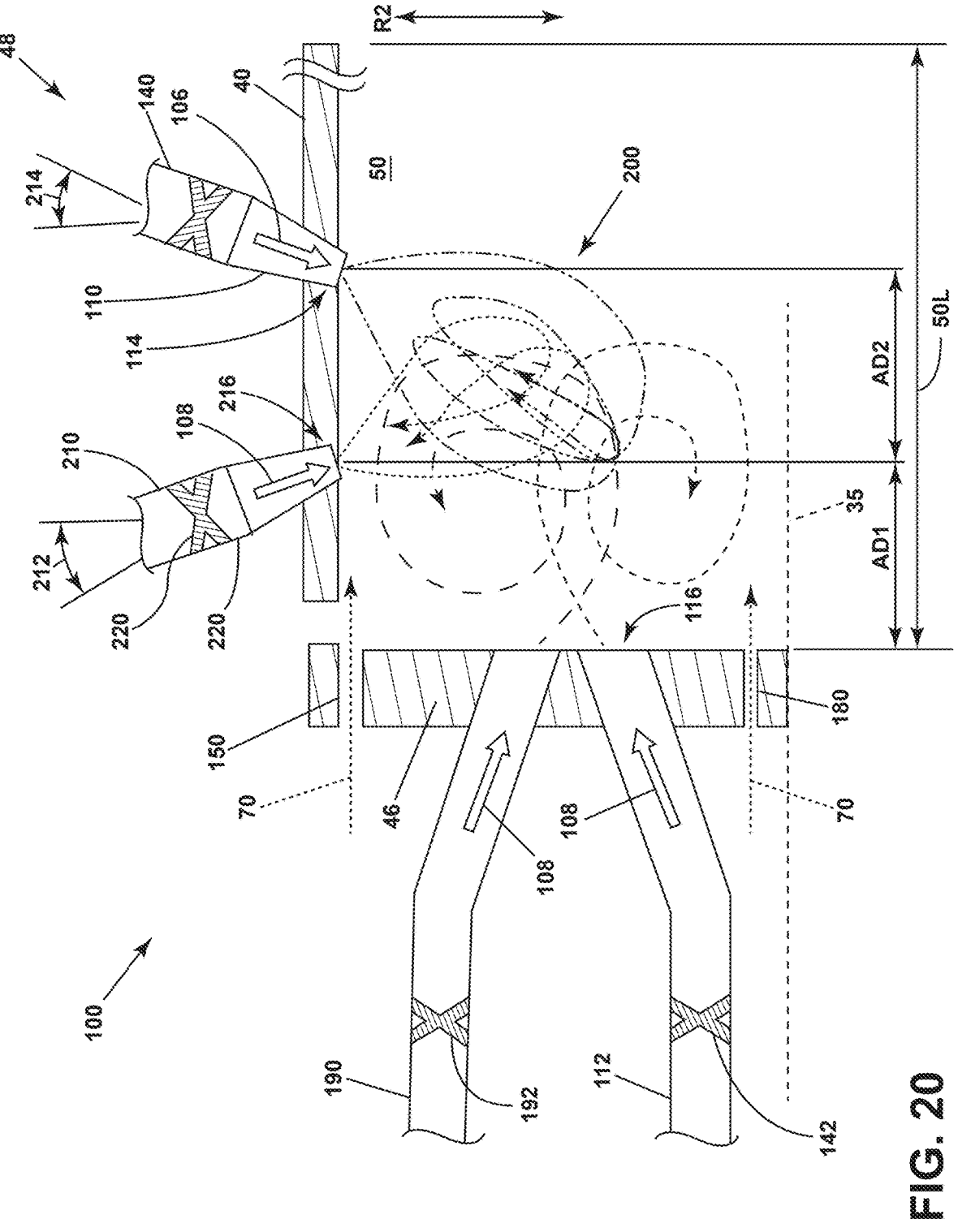
FIG. 20 is a schematic cross-sectional view illustrating portions of a fuel nozzle assembly coupled to a combustion chamber in accordance with various aspects described herein.

Referring to FIG. 20, the mixer 100 of the fuel nozzle assembly 48 can additionally include a fourth fluid passage 210 such that the fuel nozzle assembly 48 includes the first fluid passage 110 coupled to the combustor liner 40, the second fluid passage 112 coupled to the wall 46, the third fluid passage 190 coupled to the wall 46, and the fourth fluid passage 210, which can be coupled to the combustor liner 40. The first fluid passage 110 can be fluidly coupled to the first fluid supply 102 (FIG. 1) to emit the first fluid 106 into the combustion chamber 50. The second fluid passage 112, the third fluid passage 190, and the fourth fluid passage 210 can be fluidly coupled to the second fluid supply 104 (FIG. 3) to emit the second fluid 108 into the combustion chamber 50. The fourth fluid passage 210 (e.g., a third lean fluid passage) can be forward of the first fluid passage 110 and can be angled forward at a fourth fluid passage angle 212 relative to the second radial direction R2 such that the fourth fluid passage 210 emits the second fluid 108 radially inward and aft away from the wall 46. The first fluid passage 110 can be angled aft at a first fluid passage angle 214 relative to the second radial direction R2 such that the first fluid passage 110 emits the first fluid 106 radially inward and forward toward the wall 46, and such that the first fluid passage 110 and the fourth fluid passage 210 are disposed in an impinging configuration with each other, which can increase mixing between the first fluid 106 and the second fluid 108. For example, the second and third fluid passages 112, 190 can be disposed in a first impinging configuration, and the first fluid passage 110 and the fourth fluid passage 210 can be disposed in a second impinging configuration. The two impinging configurations can facilitate mixing of the first fluid 106 from the first fluid passage 110 and the second fluid 108 from the second fluid passage 112, the third fluid passage 190, and the fourth fluid passage 210 in the region of rapid mixing 200 aft of the wall 46. The two impinging configurations can facilitate mixing proximate the combustor liner 40 and facilitate mixing proximate the fuel nozzle assembly centerline 35, which can provide more uniform temperatures in the combustion chamber 50 to limit NOx emissions.

The fourth fluid passage angle 212 can be greater than 0 degrees and less than or equal to 60 degrees such that an upstream portion of the fourth fluid passage 210 is forward of a downstream portion of the fourth fluid passage 210 at the combustor liner 40. The first fluid passage angle 214 can be greater than 0 degrees and less than or equal to 60 degrees measured in the opposite direction from the second radial direction R2 than the fourth fluid passage angle 212. For example, an upstream portion of the first fluid passage 110 can be aft of a downstream portion of the first fluid passage 110 at the combustor liner 40.

An output 216 of the fourth fluid passage 210 can be disposed at the combustor liner 40 an axial distance AD1 from the wall 46. The output 114 of the first fluid passage 110 can be disposed at the combustor liner 40 a second distance AD2 aft of the output 216 such that the total distance of the output 114 from the wall 46 is the combination of AD1 and AD2. The combustion chamber 50 can include an axial length 50L. A ratio of the first and second distances AD1, AD2 to the axial length 50L can, for example, be greater than or equal to 0.2 and less than or equal to 0.7, which can provide the first fluid 106, the second fluid 108, or both, aft of the wall 46 to limit temperatures at the wall 46 while also allowing for sufficient mixing time prior to exiting the combustion chamber 50.

The fuel nozzle assembly 48 can include the air passage 150, which can extend through the wall 46 adjacent the combustor liner 40 to emit air 70 along the combustor liner 40. Additionally or alternatively, the fuel nozzle assembly 48 can include the second wall air passage 180 that can be disposed radially inward of the output 116 and radially outward of the fuel nozzle assembly centerline 35. The first fluid passage 110 can include the first swirler 140, the second fluid passage 112 can include the second swirler 142, the third fluid passage 190 can include third passage swirler 192, the fourth fluid passage 210 can include a fourth passage swirler 220, or combinations thereof. The swirl numbers of the first fluid passage 110 and the fourth fluid passage 210 can be lower than the swirl numbers of the second fluid passage 112 and the third fluid passage 190, which can be equal or not equal. In some examples, the first fluid passage 110, the fourth fluid passage 210, or both, do not include a swirler.

Figure 21:
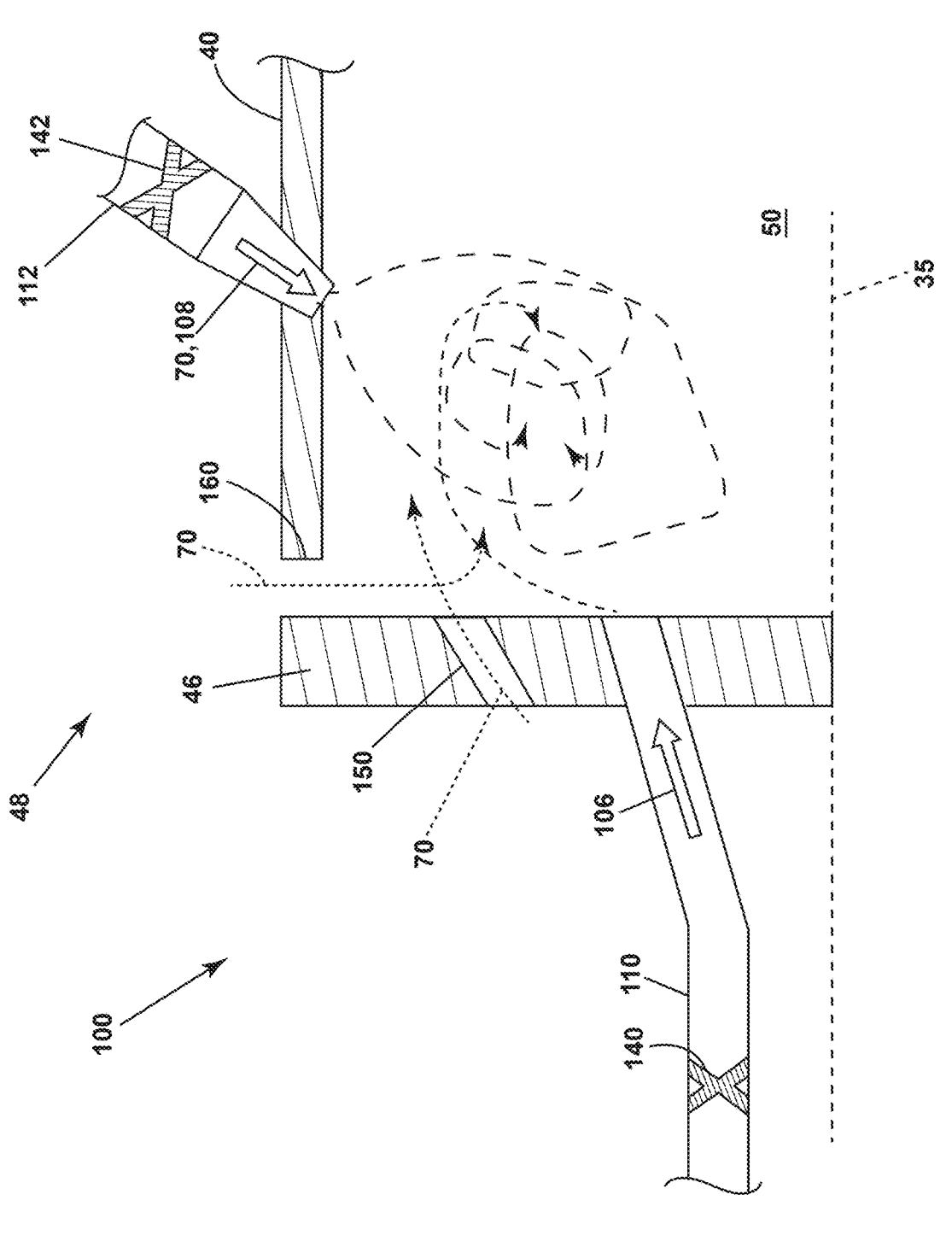
FIG. 21 is a schematic cross-sectional view illustrating portions of a fuel nozzle assembly coupled to a combustion chamber in accordance with various aspects described herein.

Referring to FIG. 21, the mixer 100 of the fuel nozzle assembly 48 can include the first fluid passage 110 coupled to the wall 46 and the second fluid passage 112 coupled to the combustor liner 40. The first fluid passage 110 can be angled outward, at least to some degree, to emit the first fluid

106 radially outward (e.g., relative to the fuel nozzle assembly centerline 35) and aft of the wall 46. The second fluid passage 112 can be angled aft, at least to some degree, to emit the second fluid 108 into the combustion chamber 50 radially inward and forward toward the wall 46, which can provide an opposing configuration for the first and second fluid passages 110, 112. The opposing configuration can provide rapid mixing of the first fluid 106 and second fluid 108 in the combustion chamber 50. In some examples, the second fluid 108 can comprise air 70 without fuel F (FIG. 3). For example, the second fluid supply 104 (FIG. 3) can provide the second fluid 108 as air 70 devoid of fuel F (FIG. 3) and the second fluid passage 112 can be an air passage.

The fuel nozzle assembly 48 can include the air passage 150, which can extend through the wall 46 and be angled radially outward toward the combustor liner 40 to emit air 70 toward and along the combustor liner 40, which can limit scrubbing of flame on the combustor liner 40 and limit temperatures at the combustor liner 40. Additionally or alternatively, the combustor liner 40 can include the second air passage 160 that can be adjacent the wall 46 to emit air 70 along and cool the wall 46. The first fluid passage 110 can include the first swirler 140 and the second fluid passage 112 can include the second swirler 142. The swirl number of the second fluid passage 112 can be lower than the swirl number of the first fluid passage 110. In some examples, the second fluid passage 112 does not include a swirler.

The combustor 30 (FIG. 2) can include various combinations of adjacent fuel nozzle assemblies 48, 348. For example, the combustor 30 (FIG. 2) can include combinations of the fuel nozzle assemblies of FIGS. 3-21 and can include fuel nozzle assemblies with combinations of aspects of the fuel nozzle assemblies shown in FIGS. 3-21. The disclosed fuel nozzle assemblies are not mutually exclusive.

Fluid passages of the fuel nozzle assemblies 48, 348, such as first fluid passages 110, 410, the second fluid passages 112, 412, the third fluid passage 190, and the fourth fluid passage 210, can be configured as separate tubes (e.g., annular tubes), passages formed in the fuel nozzle body 38 of the fuel nozzle assembly 48, or combinations thereof. Fluid passages disclosed herein as coupled to the first fluid supply 102, such as the first fluid passage 110 and, in some configurations, the third fluid passage 190, can be rich fluid passages. Fluid passages disclosed herein coupled to the second fluid supply 104, such as the second fluid passage 112, the fourth fluid passage 210, and, in some configurations, the third fluid passage 190, can be lean fluid passages.

While described with respect to a turbine engine, it should be appreciated that the combustor as described herein can be for any engine having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section, combustion section, and turbine section in serial flow arrangement, with the combustion section comprising: a combustor liner that at least partially defines a combustion chamber; and a gaseous fuel nozzle assembly fluidly coupled with the combustion chamber and comprising: a rich fuel supply configured to supply a rich mixture of gaseous fuel and air; a lean fuel supply configured to supply a lean mixture of gaseous fuel and air, the lean mixture having a lower equivalence ratio than the rich mixture; a rich fluid passage fluidly coupled to the rich fuel supply to emit the rich mixture into the combustion chamber; and a lean fluid passage fluidly coupled to the lean fuel supply to emit the lean mixture into the combustion chamber; wherein the rich fluid passage and lean fluid passage are arranged in a diverging configuration.

The gas turbine engine of any preceding clause, wherein the gaseous fuel is hydrogen gas.

The gas turbine engine of any preceding clause, wherein gaseous fuel comprises hydrogen gas and methane.

The gas turbine engine of any preceding clause, wherein the rich fluid passage and the lean fluid passage are annular and concentric.

The gas turbine engine of any preceding clause, wherein a rich fluid passage output of the rich fluid passage is disposed radially inward of a lean fluid passage output of the lean fluid passage.

The gas turbine engine of any preceding clause, wherein the diverging configuration includes the rich fluid passage directed radially inward and the lean fluid passage parallel with an axial direction of the gaseous fuel nozzle assembly.

The gas turbine engine of any preceding clause, wherein the combustion section includes a wall coupled to the combustor liner; and wherein an air passage extends through the wall radially outward of the lean fluid passage to emit air along the combustor liner.

The gas turbine engine of any preceding clause, wherein the air passage is parallel with the axial direction.

The gas turbine engine of any preceding clause, wherein the lean fluid passage and the rich fluid passage are configured to provide an amount of air to the combustion chamber; and wherein the rich fluid passage provides at least 5% and less than or equal to 25% of the amount of air to the combustion chamber.

The gas turbine engine of any preceding clause, wherein the rich fluid passage and the lean fluid passage are annular and concentric; wherein a rich fluid passage output of the rich fluid passage is disposed radially inward of a lean fluid passage output of the lean fluid passage; and wherein the gaseous fuel nozzle assembly includes an air passage disposed radially outward of the lean fluid passage.

The gas turbine engine of any preceding clause, wherein the air passage is annular.

The gas turbine engine of any preceding clause, wherein the air passage comprises a plurality of circumferentially spaced passages.

The gas turbine engine of any preceding clause, wherein the diverging configuration includes the rich fluid passage extending radially inward and the lean fluid passage extending radially outward.

The gas turbine engine of any preceding clause, wherein the rich fluid passage is configured to generate an inside-out recirculation of the rich mixture in the combustion chamber.

The gas turbine engine of any preceding clause, wherein the lean fluid passage to configured to generate an outside-in recirculation of the lean mixture in the combustion chamber.

The gas turbine engine of any preceding clause, wherein the gaseous fuel nozzle assembly and the combustor liner are configured such that the outside-in recirculation overlaps with the inside-out recirculation.

The gas turbine engine of any preceding clause, wherein the combustion section includes a wall coupled to the combustor liner; wherein the gaseous fuel nozzle assembly includes at least a portion of the wall; and wherein the combustor liner includes a height at the wall.

The gas turbine engine of any preceding clause, wherein a ratio of a lean fluid passage diameter of the lean fluid passage to the height of the combustor liner is at least 0.3 and less than or equal to 0.8.

The gas turbine engine of any preceding clause, wherein a ratio of a rich fluid passage diameter of the rich fluid passage to the height of the combustor liner is at least 0.1 and less than or equal to 0.6.

The gas turbine engine of any preceding clause, wherein the lean fluid passage comprises a swirler upstream of the combustion chamber.

The gas turbine engine of any preceding clause, further comprising a second gaseous fuel nozzle assembly disposed adjacent the gaseous fuel nozzle assembly.

The gas turbine engine of any preceding clause, wherein the second gaseous fuel nozzle assembly includes a second nozzle rich fluid passage and a second nozzle lean fluid passage that have opposite swirl directions relative to swirl directions of the rich fluid passage and the lean fluid passage of the gaseous fuel nozzle assembly.

The gas turbine engine of any preceding clause, wherein the lean fluid passage is radially outward of the rich fluid passage, relative to a centerline of the gaseous fuel nozzle assembly; and wherein the second nozzle rich fluid passage is radially outward of the second nozzle lean fluid passage, relative to a centerline of the second gaseous fuel nozzle assembly.

The gas turbine engine of any preceding clause, wherein the rich fluid passage is radially outward of the lean fluid passage, relative to a centerline of the gaseous fuel nozzle assembly, and the second nozzle rich fluid passage is radially outward of the second nozzle lean fluid passage, relative to a centerline of the second gaseous fuel nozzle assembly.

A gas turbine engine, comprising: a compressor section, combustion section, and turbine section in serial flow arrangement, with the combustion section comprising: a combustor liner at least partially defining a combustion chamber; and a gaseous fuel nozzle assembly, comprising: a wall coupled with the combustor liner and at least partially defining the combustion chamber; a rich fuel supply configured to supply a rich mixture of gaseous fuel and air; a lean fuel supply configured to supply a lean mixture of gaseous fuel and air, the lean mixture having a lower equivalence ratio than the rich mixture; a rich fluid passage fluidly coupled to the rich fuel supply to emit the rich mixture into the combustion chamber; a lean fluid passage fluidly coupled to the lean fuel supply to emit the lean mixture into the combustion chamber; and wherein the wall includes a first air passage configured to emit along the combustor liner, and the combustor liner includes a second air passage configured to emit air along the wall.

The gas turbine engine of any preceding clause, wherein the first air passage is angled radially outward.

The gas turbine engine of any preceding clause, wherein the second air passage is aligned with a radial direction of the gaseous fuel nozzle assembly.

The gas turbine engine of any preceding clause, wherein the lean fluid passage and the rich fluid passage extend radially inward.

The gas turbine engine of any preceding clause, wherein the lean fluid passage and the rich fluid passage extend radially inward at different angles.

The gas turbine engine of any preceding clause, wherein the lean fluid passage and the rich fluid passage include swirlers.

The gas turbine engine of any preceding clause, wherein the rich mixture of gaseous fuel and air has a first equivalence ratio greater than 4 and less than or equal to 10.

The gas turbine engine of any preceding clause, wherein the lower equivalence ratio of the lean mixture is greater than 0 and less than 0.4.

The gas turbine engine of any preceding clause, wherein the rich fluid passage is configured to generate a first inside-out recirculation of the rich mixture in the combustion chamber.

The gas turbine engine of any preceding clause, wherein the lean fluid passage to configured to generate a second inside-out recirculation of the lean mixture in the combustion chamber.

The gas turbine engine of any preceding clause, wherein the gaseous fuel nozzle assembly and the combustion chamber are configured such that the first inside-out recirculation overlaps with the second inside-out recirculation in the combustion chamber.

The gas turbine engine of any preceding clause, wherein the rich fluid passage is configured to generate an outside-in recirculation of the rich mixture in the combustion chamber.

The gas turbine engine of any preceding clause, wherein the lean fluid passage to configured to generate an inside-out recirculation of the lean mixture in the combustion chamber.

The gas turbine engine of any preceding clause, wherein the gaseous fuel nozzle assembly and the combustion chamber are configured such that the inside-out recirculation overlaps with the outside-in recirculation in the combustion chamber.

The gas turbine engine of any preceding clause, wherein the rich fluid passage and lean fluid passage are arranged in an impinging configuration.

The gas turbine engine of any preceding clause, wherein the rich fluid passage and the lean fluid passage have annular configurations.

The gas turbine engine of any preceding clause, wherein the wall includes a third air passage to emit air into the combustion chamber.

A gas turbine engine, comprising: a compressor section, combustion section, and turbine section in serial flow arrangement, with the combustion section comprising: a combustor liner that at least partially defines a combustion chamber; and a gaseous fuel nozzle assembly, comprising: a rich fuel supply configured to supply a rich mixture of gaseous fuel and air; a lean fuel supply configured to supply a lean mixture of gaseous fuel and air, the lean mixture having a lower equivalence ratio than the rich mixture; a wall coupled with the combustor liner; a rich fluid passage fluidly coupled to the rich fuel supply to emit the rich mixture into the combustion chamber; and a lean fluid passage fluidly coupled to the lean fuel supply to emit the lean mixture into the combustion chamber; wherein one of the rich fluid passage or the lean fluid passage is coupled to the combustor liner and the other of the rich fluid passage or the lean fluid passage is coupled to the wall.

The gas turbine engine of any preceding clause, wherein the lean fluid passage is coupled to the wall and is angled radially outward.

The gas turbine engine of any preceding clause, wherein the combustor liner includes a liner air passage to emit air along the wall; and wherein the first air passage is forward of an output of the rich fluid passage.

The gas turbine engine of any preceding clause, wherein the rich fluid passage is angled forward to emit the rich mixture radially inward and away from the wall.

The gas turbine engine of any preceding clause, wherein the lean fluid passage and the rich fluid passage are configured such that a recirculation of the lean mixture and a recirculation of the rich mixture overlap in the combustion chamber.

The gas turbine engine of any preceding clause, wherein the lean fluid passage includes a swirler.

The gas turbine engine of any preceding clause, wherein the rich fluid passage includes one or more second swirler vanes.

The gas turbine engine of any preceding clause, wherein the lower equivalence ratio is greater than 0 and less than or equal to 0.4.

The gas turbine engine of any preceding clause, a rich equivalence ratio of the rich mixture is at least 4 and less than or equal to 10.

The gas turbine engine of any preceding clause, wherein the combustor liner includes a liner air passage to emit air along the wall.

The gas turbine engine of any preceding clause, wherein the lean fluid passage is a first lean fluid passage; and wherein the gaseous fuel nozzle assembly comprises a second lean fluid passage.

The gas turbine engine of any preceding clause, wherein the first lean fluid passage is coupled to the wall, and the second lean fluid passage is coupled to the combustor liner.

The gas turbine engine of any preceding clause, wherein the first lean fluid passage is angled radially outward.

The gas turbine engine of any preceding clause, wherein the rich fluid passage is angled forward to emit the rich mixture radially inward and aft away from the wall.

The gas turbine engine of any preceding clause, wherein the second lean fluid passage is angled to emit the lean mixture radially inward and forward toward the wall.

The gas turbine engine of any preceding clause, wherein the combustor liner includes an air passage forward of the rich fluid passage.

The gas turbine engine of any preceding clause, wherein the rich fluid passage is forward of the second lean fluid passage.

The gas turbine engine of any preceding clause, wherein swirl numbers of the rich fluid passage and the second lean fluid passage are lower than a swirl number of the first lean fluid passage.

The gas turbine engine of any preceding clause, wherein the wall includes a wall air passage to emit air along the combustor liner.

The gas turbine engine of any preceding clause, wherein the wall air passage is angled radially outward to emit air toward the combustor liner.

The gas turbine engine of any preceding clause, wherein the lean fluid passage is angled radially inward.

The gas turbine engine of any preceding clause, wherein the rich fluid passage is centered on and parallel with a centerline of the gaseous fuel nozzle assembly.

The gas turbine engine of any preceding clause, wherein the lean fluid passage is a first lean fluid passage; and wherein the gaseous fuel nozzle assembly includes a second lean fluid passage coupled with the wall.

The gas turbine engine of any preceding clause, wherein the first lean fluid passage is angled forward to emit the lean mixture radially inward and aft away from the wall.

The gas turbine engine of any preceding clause, wherein the rich fluid passage is a first rich fluid passage and is coupled with the combustor liner.

The gas turbine engine of any preceding clause, wherein the lean fluid passage is angled radially inward.

The gas turbine engine of any preceding clause, wherein the gaseous fuel nozzle assembly includes a second rich fluid passage coupled with the wall.

The gas turbine engine of any preceding clause, wherein the second rich fluid passage is angled radially outward.

The gas turbine engine of any preceding clause, wherein a second rich fluid passage output of the second rich fluid passage is radially inward of a lean fluid passage output of the lean fluid passage.

The gas turbine engine of any preceding clause, wherein the first rich fluid passage is perpendicular to the combustor liner.

The gas turbine engine of any preceding clause, wherein the gaseous fuel nozzle assembly includes a first air passage extending through the wall radially outward of the lean fluid passage output and the second rich fluid passage output.

The gas turbine engine of any preceding clause, wherein the gaseous fuel nozzle assembly includes a plurality of second air passages extending through the wall radially inward of the lean fluid passage output and the second rich fluid passage output.

The gas turbine engine of any preceding clause, wherein the lean fluid passage is a first lean fluid passage and the gaseous fuel nozzle assembly comprises a second lean fluid passage.

The gas turbine engine of any preceding clause, wherein the first lean fluid passage and the second lean fluid passage are coupled to the wall.

The gas turbine engine of any preceding clause, wherein the first lean fluid passage and the second lean fluid passage are coupled to the wall in an impinging configuration.

The gas turbine engine of any preceding clause, wherein the rich fluid passage is angled to emit the rich mixture radially inward and forward toward the wall.

The gas turbine engine of any preceding clause, wherein a rich fluid passage angle is greater than 0 degrees and less than or equal to 60 degrees relative to a radial direction of the gaseous fuel nozzle assembly.

The gas turbine engine of any preceding clause, wherein the gaseous fuel nozzle assembly includes a third lean fluid passage.

The gas turbine engine of any preceding clause, wherein the first lean fluid passage and the second lean fluid passage are coupled to the wall; and wherein the third lean fluid passage is coupled to the combustor liner.

The gas turbine engine of any preceding clause, wherein the third lean fluid passage is angled aft.

The gas turbine engine of any preceding clause, wherein a rich fluid passage output of the rich fluid passage is aft of a third lean fluid passage output of the third lean fluid passage.

The gas turbine engine of any preceding clause, wherein the rich fluid passage is angled forward.

The gas turbine engine of any preceding clause, wherein the first lean fluid passage and the second lean fluid passage are annular.

The gas turbine engine of any preceding clause, wherein the first lean fluid passage and the second lean fluid passage are concentric.

The gas turbine engine of any preceding clause, wherein the first lean fluid passage and the second lean fluid passage are disposed in an impinging configuration.

A gas turbine engine, comprising: a compressor section, combustion section, and turbine section in serial flow arrangement, with the combustion section comprising: a combustor liner that at least partially defines a combustion chamber; and a gaseous fuel nozzle assembly, comprising: a rich fuel supply configured to supply a rich mixture of gaseous fuel and air; a wall coupled with the combustor liner; a first fluid passage fluidly coupled to the rich fuel supply to emit the rich mixture into the combustion chamber; and a second fluid passage to emit air into the combustion chamber; wherein one of the first fluid passage or the second fluid passage is coupled to the combustor liner and the other of the first fluid passage or the second fluid passage is coupled to the wall.

A gas turbine engine, comprising: a compressor section, combustion section, and turbine section in serial flow arrangement, with the combustion section comprising: a combustor liner that at least partially defines a combustion chamber; and a gaseous fuel nozzle assembly, comprising: a rich fuel supply configured to supply a rich mixture of gaseous fuel and air; a wall coupled with the combustor liner; wherein at least one of: the wall includes a first air passage configured to emit air along the combustor liner, or the combustor liner includes a second air passage configured to emit air along the wall.

The gas turbine engine of any preceding clause, wherein the wall includes the first air passage, and the combustor liner includes the second air passage.

The gas turbine engine of any preceding clause, wherein the second fluid passage is coupled with the combustor liner.

The gas turbine engine of any preceding clause, wherein the first fluid passage is coupled to the wall and angled radially outward.

The gas turbine engine of any preceding clause, wherein the second fluid passage is angled to emit air radially inward and forward toward the wall.

The gas turbine engine of any preceding clause, wherein the combustor liner defines a liner air passage to emit air along the wall.

The gas turbine engine of any preceding clause, wherein the wall defines a second air passage to emit air along the combustor liner.

The gas turbine engine of any preceding clause, wherein the first fluid passage is annular and centered with a centerline of the gaseous fuel nozzle assembly.

A gas turbine engine, comprising: a compressor section, combustion section, and turbine section in serial flow arrangement, with the combustion section comprising: a combustor liner that at least partially defines a combustion chamber; and a gaseous fuel nozzle assembly fluidly coupled with the combustion chamber and comprising: a wall coupled to the combustor liner; a rich fuel supply configured to supply a rich mixture of gaseous fuel and air; a first annular fluid passage fluidly coupled to the rich fuel supply to emit the rich mixture into the combustion chamber; and a second annular fluid passage to emit air into the combustion chamber; wherein the first annular fluid passage and lean fluid passage are arranged in a concentric and diverging configuration.

The gas turbine engine of any preceding clause, wherein the wall is devoid of passages apart from the first annular fluid passage and the second annular fluid passage.

The gas turbine engine of any preceding clause, wherein a portion of the combustor liner aligned with the gaseous fuel nozzle assembly is devoid of passages fluidly coupled with the combustion chamber.

What is claimed is:

1. A gas turbine engine, comprising:
a compressor section, combustion section, and turbine section in serial flow arrangement, with the combustion section comprising:
a combustor liner that at least partially defines a combustion chamber, the combustion chamber defining a centerline; and
a gaseous fuel nozzle assembly fluidly coupled with the combustion chamber and comprising:
a rich fuel supply including a rich mixture of gaseous fuel and air;
a lean fuel supply including a lean mixture of gaseous fuel and air, the lean mixture having a lower equivalence ratio than the rich mixture;
a rich fluid passage fluidly coupled to the rich fuel supply and emitting the rich mixture in a direction towards the centerline of the combustion chamber into the combustion chamber; and
a lean fluid passage fluidly coupled to the lean fuel supply and emitting the lean mixture in a direction away from the centerline of the combustion chamber into the combustion chamber;
wherein the combustion section includes a wall coupled to the combustor liner;
wherein the gaseous fuel nozzle assembly includes at least a portion of the wall; and
wherein the combustor liner includes a height at the wall;
wherein a ratio of a lean fluid passage diameter of the lean fluid passage to the height of the combustor liner is at least 0.3 and less than or equal to 0.8;
wherein a ratio of a rich fluid passage diameter of the rich fluid passage to the height of the combustor liner is at least 0.1 and less than or equal to 0.6.

2. The gas turbine engine of claim 1, wherein the rich mixture of gaseous fuel and air has a first equivalence ratio greater than 4 and less than or equal to 10.

3. The gas turbine engine of claim 2, wherein the lean mixture of gaseous fuel and air has a second equivalence ratio of greater than 0 and less than or equal to 0.4.

4. The gas turbine engine of claim 3, wherein the gaseous fuel is hydrogen gas.

5. The gas turbine engine of claim 1, wherein the rich fluid passage and the lean fluid passage are annular and concentric.

6. The gas turbine engine of claim 5, wherein a rich fluid passage output of the rich fluid passage is disposed radially inward of a lean fluid passage output of the lean fluid passage.

7. The gas turbine engine of claim 1, wherein the lean fluid passage and the rich fluid passage are configured to provide an amount of air to the combustion chamber; and wherein the rich fluid passage provides at least 5% and less than or equal to 25% of the amount of air to the combustion chamber.

8. The gas turbine engine of claim 1, wherein the rich fluid passage is configured to generate an inside-out recirculation of the rich mixture in the combustion chamber;

wherein the lean fluid passage to configured to generate an outside-in recirculation of the lean mixture in the combustion chamber; and wherein the gaseous fuel nozzle assembly and the combustor liner are configured such that the outside-in recirculation overlaps with the inside-out recirculation.

9. The gas turbine engine of claim 1, further comprising a second gaseous fuel nozzle assembly disposed adjacent the gaseous fuel nozzle assembly.

\* \* \* \* \*